US005617114A

United States Patent [19]
Bier et al.

[11] Patent Number: 5,617,114
[45] Date of Patent: Apr. 1, 1997

[54] USER INTERFACE HAVING CLICK-THROUGH TOOLS THAT CAN BE COMPOSED WITH OTHER TOOLS

[75] Inventors: Eric A. Bier, Mountain View, Calif.; William A. S. Buxton, Toronto, Canada; Maureen C. Stone, Los Altos, Calif.

[73] Assignee: Xerox Corporation, Stamford, Conn.

[21] Appl. No.: 449,584

[22] Filed: May 24, 1995

Related U.S. Application Data

[63] Continuation of Ser. No. 95,445, Jul. 21, 1993, abandoned.

[51] Int. Cl.$^6$ .................................................. G09G 5/00
[52] U.S. Cl. ...................... 345/113; 345/146; 345/902
[58] Field of Search ................................ 345/146, 145, 345/113, 115, 119, 120, 902; 395/156, 157; 364/474.22

[56] References Cited

U.S. PATENT DOCUMENTS

| | | | |
|---|---|---|---|
| Re. 32,632 | 3/1988 | Atkinson | 340/709 |
| 4,555,775 | 11/1985 | Pike | 364/900 |
| 4,622,545 | 11/1986 | Atkinson | 340/747 |
| 4,686,522 | 8/1987 | Hernandez et al. | 345/146 |
| 4,748,441 | 5/1988 | Brzezinski . | |
| 4,788,538 | 11/1988 | Klein et al. | 340/747 |
| 4,827,253 | 5/1989 | Maltz | 345/113 |
| 4,896,291 | 1/1990 | Gest et al. | 364/900 |
| 4,910,683 | 3/1990 | Bishop et al. | 364/518 |
| 4,917,516 | 4/1990 | Retter | 400/489 |
| 4,931,783 | 6/1990 | Atkinson | 345/146 |
| 4,982,343 | 1/1991 | Hourvitz et al. | 345/113 |
| 5,157,384 | 10/1992 | Greanias et al. | 340/706 |
| 5,204,947 | 4/1993 | Bernstein et al. . | |
| 5,250,929 | 10/1993 | Hoffman et al. | 345/146 |
| 5,276,797 | 1/1994 | Bateman et al. . | |
| 5,283,560 | 2/1994 | Bartlett | 345/902 |
| 5,287,417 | 2/1994 | Eller et al. | 382/41 |
| 5,341,466 | 8/1994 | Perlin et al. | 395/139 |
| 5,381,158 | 1/1995 | Takahara et al. | 345/156 |

FOREIGN PATENT DOCUMENTS

| | | |
|---|---|---|
| 0533424 | 3/1993 | European Pat. Off. . |
| 62-165232 | 7/1987 | Japan . |
| 3219324 | 9/1991 | Japan . |

OTHER PUBLICATIONS

Macintosh "Macpaint", 1983.
Brown et al., "Windows on tablets as a means of achieving virtual input devices". In D. Diaper et al. (Eds). *Human–Computer Interaction—Interact '90*. Amsterdam: Elsevier Science Publishers B.V. (North Holland), 675–681 (1990) [Reprint of article pp. 1–12 submitted].
Hardock, Gary. "Design issues for line–driven text editing/Annotation Systems". 11715 Graphics Interface 1991. 3–7 Jun. 1991, Calgary (1991) Toronto, ON, CA, pp. 77–84.

(List continued on next page.)

*Primary Examiner*—Richard Hjerpe
*Assistant Examiner*—Regina Liang
*Attorney, Agent, or Firm*—Townsend and Townsend and Crew

[57] ABSTRACT

A user interface technique operates in the environment of a processor-controlled machine for executing a program that operates on a set of underlying data and displays a visible representation thereof. The system further provides a visual depiction of a set of tools. The tools include click-through tools that can be combined with other tools (including other click-through tools) to provide composite tools. A click-through tool includes a generally transparent delineated active area that is movable so that it can be placed over a desired portion of the visible representation. When the user interacts with the visible representation through the active area, the action takes on an attribute of the particular click-through tool. A click-through tool can be superimposed on another click-through tool, whereupon an action taken through the two click-through tools onto the visible representation takes on attributes of both tools.

28 Claims, 16 Drawing Sheets

OTHER PUBLICATIONS

Canvas 3.0 User Guide: Chapter 1 ("The Fundamentals"), p. 2; and Section 19 (Reference), pp. 14–18, 59–60, 69–70, 90–91, 97–98, 100–102, 130, 150–151, 171–172, 173–174, 181–182, 189–197, 300 (Jun. 15, 1991 (Deneba Software, Miami, FL)).

"User Interface for Data Entry with Pen Device," IBM Technical Disclosure Bulletin, vol. 37, No. 1, Jan. 1994, pp. 33–34.

"Menu Manager," IBM Technical Disclosure Bulletin, vol. 34, No. 12, May 1992, pp. 113–116.

Hopkins, D., "Directional selection is Easy as Pie Menus," Proceedings Fourth Computer Graphics Workshop, 8 Oct. 1987, Cambridge, MA, p. 103.

Kurtenbach, G., et al., "Issues In Combining Marking And Direct Manipulation Techniques," Proceedings on the Symposium on User Interface Software and Technology, Nov. 1991, South Carolina, US, pp. 137–144.

Eric A. Bier and Maureen C. Stone. Snap–Dragging. In Proceedings of Siggraph '86 (Dallas, August), Computer Graphics, vol. 20, No. 4, ACM, 1986, pp. 233–240.

Eric A. Bier. Snap–Dragging: Interactive Geometric Design in Two and Three Dimensions. Xerox PARC Technical Report EDL–89–2 (Sep. 1989). Also available as Report No. UCB/CSD 88/416, Apr. 28, 1988, Computer Science Division, Department of Electrical Engineering and Computer Science, University of California, Berkeley, CA 94720.

Eric A. Bier and Aaron Goodisman. Documents as User Interfaces. In R. Furuta (ed). EP90, Proceedings of the International Conference on Electronic Publishing, Document Manipulation and Typography, Cambridge University Press, 1990, pp. 249–262.

Eric A. Bier. EmbeddedButtons: Documents as User Interfaces. In Proceedings of the ACM SIGGRAPH Symposium on User Interface Software and Technology (Hilton Head, South Carolina, Nov.), ACM, 1991, pp. 45–53.

Eric A. Bier and Steve Freeman. MMM: A User Interface Architecture for Shared Editors on a Single Screen. In Proceedings of the ACM SIGGRAPH Symposium on User Interface Software and Technology (UIST '91 Hilton Head, South Carolina, Nov. 11–13), ACM, 1991, pp. 79–86.

Eric A. Bier. EmbeddedButtons: Supporting Buttons in Documents. Xerox PARC Technical Report ISTL –ADoc–1992–10–01 (Oct. 1992). Also available in ACM Transactions on Information Systems, vol. 10, No. 4, Oct. 1992, pp. 381–407.

Paul M. English, Ethan S. Jacobson, Robert A. Morris, Kimbo B. Mundy, Stephen D. Pelletier, Thomas A. Polluci, and H. David Scarbro. An Extensible, Object–Oriented System for Active Documents. In R. Furuta (ed). EP90, Proceedings of the International Conference on Electronic Publishing, Document Manipulation and Typography, Cambridge University Press, 1990, pp. 263–276.

David Goldberg and Aaron Goodisman. Stylus User Interfaces for Manipulating Text. In Proceedings of the ACM Symposium on User Interface Software and Technology (UIST '91, Hilton Head, South Carolina, Nov.), ACM 1991, pp. 127–135.

Don Hopkins. The Design and Implementation of Pie Menus. Dr. Dobb's Journal. vol. 16, No. 12, Dec. 1991, pp. 16–26.

David Kurlander and Steven Feiner. Interactive Constraint–Based Search and Replace. In Proceedings of CHI '92 (Monterey, California, May 3–7, 1992), Human Factors in Computing Systems, ACM, New York, 1992, pp. 609–618.

Gordon Kurtenbach and William Buxton. Issues in Combining Marking and Direct Manipulation Techniques. In Proceedings of the ACM Symposium on User Interface Software and Technology (UIST '91 Hilton Head, South Carolina, Nov. 11–13), ACM, 1991, pp. 137–144.

J. K. Ousterhout. Tcl: An Embeddable Command Language. In winter USENIX Conference Proceedings, 1990, pp. 133–146.

Ken Pier, Eric A. Bier, and Maureen C. Stone. An Introduction to Gargoyle: An Interactive Illustration Tool. Xerox PARC Technical Report EDL–89–2 (Jan. 1989). Also available in Proceedings of the Intl. Conf. on Electronic Publishing, Document Manipulation and Typography (Nice, France, Apr. 1988). Cambridge Univ. Press, (1988), pp. 223–238.

Dean Rubine. Specifying Gestures by Example. In Proceedings of ACM SIGGRAPH '91, Computer Graphics, vol. 25, No. 4, Jul. 1991, pp. 329–337.

Daniel C. Swinehart, Polle T. Zellweger, Richard J. Beach, Robert B. Hagmann. A Structural View of the Cedar Programming Environment. Xerox PARC Technical Report CSL–86–1. Also available as ACM Transactions on Programming Languages and Systems, vol. 8, No. 4, 1986, pp. 419–490.

David Kurtlander and Eric A. Bier. Graphical Search and Replace. Computer Graphics, vol. 22, No. 4, Aug. 1988, pp. 113–120.

Myron W. Krueger, Thomas Gionfriddo, and Katrin Hinrichsen. Videoplace—An Artificial Reality. CHI '85 Proceedings, Apr. 1985, pp. 35–40.

Alto User's Handbook. Chapter 4 (Markup User's Manual), Xerox Corporation Sep. 1979, pp. 85–95.

Ken Perlin and David Fox. Pad An Alternative Approach to the Computer Interface. Proceedings of Siggraph '93 (Anaheim, California Aug. 1–6, 1993) Computer Graphics Proceedings, Annual Conference Series, pp. 57–64.

Manojit Sarkar and Marc H. Brown. Graphical Fisheye Views of Graphs. CHI '92 Proceedings, May 3–7, 1992, pp. 83–91.

William Buxton and Brad A Myers. A Study in Two–Handed Input. CHI '86 Proceedings, Apr. 1986, pp. 321–326.

Joel F. Bartlett. Transparent Controls for Interactive Graphics. WRL Technical Note TN–30, Digital Equipment Corporation, Jul. 1992, pp. 1–9.

Paul Kabbash, I. Scott MacKenzie and William Buxton. Human Performance Using Computer Input Devices in the Preferred and Non–Preferred Hands. Proceedings of Inter-Chi Conference (Human Factors in Computing Systems) (Amsterdam Apr. 1993) ACM, pp. 474–481.

William Buxton. There's More to Interaction Than Meets the Eye: Some Issues in Manual Input. Chapter 8: The Haptic Channel, pp. 366–375 (from Readings in Human–Computer Interaction; A Multidisciplinary Approach, Morgan Kaufman Publishers, Inc. 1987).

USER INTERFACE HAVING CLICK-THROUGH TOOLS THAT CAN BE COMPOSED WITH OTHER TOOLS

This is a Continuation of application Ser. No. 08/095,445, filed Jul. 21, 1993, now abandoned.

CROSS REFERENCE TO RELATED APPLICATIONS

The following three commonly-owned copending applications, including this one, are being filed concurrently and the other two are incorporated by reference into this one:

Eric A. Bier, William A. S. Buxton, entitled "USER INTERFACE HAVING MOVABLE SHEET WITH CLICK-THROUGH TOOLS" U.S. application Ser. No. 08/095,598, now U.S. Pat. No. 5,581,670;

William A. S. Buxton and Eric A. Bier, entitled "USER INTERFACE HAVING SIMULTANEOUSLY MOVABLE TOOLS AND CURSOR" U.S. application Ser. No. 08/095,591; and Eric A. Bier, William A. S. Buxton, and Maureen C. Stone entitled "USER INTERFACE HAVING CLICK-THROUGH TOOLS THAT CAN BE COMPOSED WITH OTHER TOOLS".

BACKGROUND OF THE INVENTION

The present invention relates generally to processor-controlled machines such as computers and more specifically to user interfaces for allowing a user to interact with the machine.

A frequent use of a processor-controlled machine such as a computer is to communicate information to a user of the machine and accept information from the user, thereby allowing the user to perform a specified task. Depending on the task at hand, the user will often make use of a task-specific application program such as a word processor (sometimes referred to as a text editor), a spreadsheet, a database, or a drawing program (sometimes referred to as a graphics editor). A reference to a specific type of program or editor is not intended to imply a stand-alone application program having only the particular functionality, since many programs have more than one type of functionality.

A typical application program consists of a set of instructions (the "application") that are executed in response to input signals to create and modify associated data (sometimes referred to as the underlying data). In many instances, this associated data is stored on a disk as a data file (sometimes referred to as "the file"), and portions are read into memory during program execution. For at least some applications, the data represents a document that is to be viewed (e.g., printed or displayed on a screen), and the application allows a user to modify the document.

In many instances, a user provides at least some of the input signals through one or more input devices, often a keyboard and a pointing device such as a mouse. By way of background, a mouse is a device that is moved over a work surface, typically next to the keyboard, and provides position signals so as to cause a cursor on the screen to move in accordance with the mouse's movements. The cursor is a special symbol that is used by an interactive program as a pointer or attention-focusing device. The mouse contains one or more pushbutton switches ("buttons") to provide additional input signals, which may be interpreted as part of a cursor event.

A display device, typically a visual display device such as a cathode ray tube (CRT) or a liquid crystal display (LCD), provides the user with information about the application and the underlying data, and allows the user to generate appropriate input signals and thus control the operation of the machine to produce the intended work product. The combination of input devices, display devices, and the nature of the information that the application provides the user may be thought of as the user interface to the application.

Although it is in principle possible for every application program to be entirely self-sufficient, it is almost universally the case that the application program executes in conjunction with an operating system ("OS"). The OS is a program that schedules and controls the machine resources to provide an interface between the application programs and the machine hardware. The OS typically provides the basic housekeeping functions that all application programs are likely to require, such as maintaining a file system, scheduling the CPU, receiving input from input devices, communicating with storage devices, sending data to display devices, and providing a generic mechanism according to which a user can manage files and cause various applications to execute. In the world of personal computers ("PCs") and workstations, operating systems are often associated with a particular type of hardware configuration, but this is not necessarily the case. Unix is an example of an OS that has been ported to run on many types of machine.

One type of operating system that has come into increasing use in recent years provides a graphical user interface ("GUI"). Apple Computer's Macintosh OS, IBM's OS/2, and Microsoft's Windows (actually a GUI shell that runs on top of a character-based operating system known as DOS) are the best known GUIs in the PC realm. The Macintosh OS has to date been available only on Apple's own Macintosh PCs based on the Motorola 680×0 family of microprocessors while OS/2 and Windows have only been available on so-called IBM-compatible PCs based on the Intel 80×86 family of microprocessors. This trend is in the process of changing, with Microsoft's Windows NT having versions capable of running on more than one type of microprocessor.

One relevant aspect of a GUI is that an open file for a given application is typically given a window, which is a movable and resizable region on the screen. The OS can have its own windows showing directory structures, with files and applications possibly being represented by icons (small graphical objects representing actions or items). There may be other windows that do not correspond to open files. An advantage of a GUI is that it provides a rather consistent user environment across applications. Some GUIs allow multiple applications to be open at the same time.

Regardless of the type of OS, the application program, with varying amounts of help from the OS, typically provides the user with a visible representation (sometimes referred to as the "screen image" or the "display image") of the underlying data. The user acts on the visible representation, and the program translates these actions to operations on the underlying data. As used herein, the term "visible representation" will refer to the visual representation of the underlying data not only for application programs, but for all kinds of programs, including the OS and various types of utility programs.

For example, in a word-processor, the underlying data consists of text with associated information specifying how the document will look when it is printed out on a printer. The associated information relates to document layout such as paragraphs and columns, and to text attributes such as font, size, style, and color. Depending on the particular word-processor and the operating system, the screen image may be limited to the text content, or may show the document substantially as it will appear when printed (WYSIWYG—pronounced "wizzywig," an acronym for "what you see is what you get"). A program designed for a character-based OS such as DOS is likely to provide something approaching the former, one designed for a GUI is likely to provide something approaching the latter.

A similar range of possible screen images will be found in other types of application programs. For example, in a drawing program, the underlying data will contain a description of each graphical object that will appear on the document. The description includes what is needed to give the object its intended appearance, including shape, size, line color and thickness, fill color and pattern, relative position in the plane of the document, and stacking order (whether the object is in front of or behind other objects). The screen image may show only the outlines of the objects (wireframe view) or may be a full WYSIWYG view.

Regardless of the type of application, the user manipulates input devices with reference to the screen image in order to effect desired changes. This is typically done by placing a cursor at a particular position on the screen that corresponds to the displayed location of an object to be modified, and executing one or more user events such as keystrokes or mouse actions. Mouse actions include button depression, button release, mouse movement, clicks, and drags. A mouse click refers to the user depressing and releasing one of the buttons without moving the mouse, but the term is also used to refer to the act of depressing one of the buttons. A drag (or sometimes click-and-drag) refers to the user positioning the cursor with the mouse, depressing one of the buttons, moving the mouse to a new position with the button still down, and releasing the button at the new location. The effect of mouse button depressions, mouse button releases, clicks, and drags may be modified by holding down a keyboard key or a different mouse button (if present).

For example, placing a cursor at a particular location in a word processor image may operate to insert typed text at that location. Dragging the cursor over a portion of the displayed text may select the text (shown on the screen as highlighted) so that the user can apply an operation (such as deleting, moving, or changing the font) to the selected text by some other mechanism. Depending on the application and the desired operation, the mechanism may be selecting the operation from a menu or entering a command from the keyboard.

Similarly, in a drawing program, the cursor can be placed in a mode by clicking on a tool icon (e.g., rectangle tool, line tool, polygon tool) so that subsequent clicks and drags with the cursor result in the creation of graphical objects. Clicking on an existing object with a plain cursor may result in selecting the object so that an operation may be applied via some other mechanism. If a drag is initiated with the cursor on an object, the result of the drag may be to cause the object to move along with the cursor, or may be to cause the object to be resized, depending on the cursor location on the object.

For users to be more productive, they should be provided with tools that are relatively easy to learn, easy to use, and powerful. These goals are sometimes easy to achieve individually, but rarely in combination. Nevertheless, considerable efforts have been expended in attempts to design user interfaces that are more intuitive, efficient, and versatile. The example discussed below, taken from the realm of drawing programs, shows the direction in which some of these efforts have led, and the way that improving one aspect of a user interface can degrade another.

A common configuration for drawing programs has a fixed tool palette to one side of the drawing area and a menu bar above the drawing area. To change tools, the user moves the cursor to the palette, clicks on the icon for the desired tool, and moves the cursor back to the appropriate location in the drawing area. To effect a desired operation on a desired object, the user moves the cursor to the object, clicks the object to select the object, moves the cursor to the menu bar, depresses the mouse button to pull down the menu, drags to the desired menu item, and releases the mouse button. The user then moves the cursor to the drawing area, to another item in the menu bar, or to the tool palette. This is a lot of mouse movement for even the simplest actions.

Tear-off menus and movable tool palettes allow the user to position what amount to permanently open menus and the tool palette near the area where drawing is actively occurring, and thereby reduce the length of mouse travel. Tear-off menus and movable palettes have made drawing more efficient in the sense of reducing the distances the user has to move the cursor, but have made it less efficient in another. They tend to take up a lot of the drawing area, especially near where the user is drawing. This can result in the user's constantly having to interrupt the drawing tasks to move the menus and palettes out of the way. This difficulty is compounded by the fact that as programs have gotten more powerful (greater functionality), the menus have grown longer and take up even more area. Unfortunately, this example of the trade-offs encountered in trying to meet the above goals is far from rare.

SUMMARY OF THE INVENTION

The present invention provides a user interface technique that allows a user to perform many common tasks with fewer actions, thereby significantly enhancing productivity. The technique makes use of actions with which the user tends to be familiar, and therefore may be learned rather quickly. The invention may be implemented in the context of a single program, or may be incorporated into the operating system so as to be available across different programs, including the operating system.

The invention operates in the environment of a processor-controlled machine for executing a program that operates on a set of underlying data and displays a visible representation thereof. The system further provides a visual depiction of a set of controllers, such as tool palettes, property palettes, menus, switches, dialog boxes, and sliders. The controllers are collectively referred to as tools. The user normally specifies operations to the program by interacting with the tools and the visible representation (using a set of input devices), and views the results of those operations on a display device. The user typically positions a cursor at a desired location and takes an action, such as a mouse click, with the cursor.

In brief, the invention is characterized by what are referred to as click-through tools that can be combined with other tools (including other click-through tools) to provide composite tools. The visual depiction of a click-through tool includes a generally transparent delineated active area that is movable so that it can be placed over a desired portion of the visible representation. When the user interacts with the visible representation through the active area, the action takes on an attribute of the particular click-through tool. In an embodiment of the invention that operates in the context of a drawing program, where the visible representation is a representation of a set of graphical objects, the click-through tools may include tools for creating objects, and tools for copying, modifying, and deleting existing objects.

Once a click-through tool has been positioned relative to the visible representation, the result of an action through the tool will typically depend on the particular location within the active area that the action occurs. Put another way, the result of an action through a click-through tool will typically depend on the portion of the visible representation that is under the cursor when the action is taken. While a conventional tool also has an active area, and the result of an action on the tool depends on the tool, the result normally does not depend on the location within the active area that the action occurs or the location of the tool relative to the visible representation. Conventional tools are not normally transparent, although there is no fundamental reason that they cannot be.

The act of combining a click-through tool with another tool is referred to as composition. A click-through tool can be superimposed on another click-through tool, whereupon an action taken through the two click-through tools onto the visible representation takes on attributes of both tools. The two tools can be grouped to move as a unit if desired. A click-through tool can also be superimposed on a conventional tool, and an action taken through the click-through tool onto the conventional tool. Again, this action takes on attributes of both tools. Where the conventional tool is a modal tool, subsequent actions with the modal tool carry the attribute of the click-through tool. Additionally, a conventional modal tool can be invoked, and subsequent actions taken through a click-through tool, in which case the use of the conventional tool takes on the attribute of the click-through tool. Where a click-through tool is superimposed over only a portion of another tool, the user has the option of clicking in the overlapping area to achieve the composite action, or clicking in a non-overlapping area to achieve the action of the single non-composed tool.

In a specific embodiment, each click-through tool issues commands and is responsible for combining its action with the action that the event has accumulated at the time that the tool receives the event. The new action can be computed from the existing action by one of a variety of methods, including adding the action's command list to the end of the existing command list to create a compound action, adding the action's command list to the beginning of the existing list, removing one or more commands from the list, changing the command names used in some or all of the received actions, modifying the values specified after the command name of a command, or modifying the coordinates <x,y> specified in a command.

In some embodiments, groups of tools will move together under the user's control, and so can be thought of as being located on a transparent overlay that can be moved relative to the visible representation. The overlay is preferably subject to positioning by an input device controlled by the user's non-dominant hand (e.g., a right-handed user's left hand).

A further understanding of the nature and advantages of the present invention may be realized by reference to the remaining portions of the specification and the drawings.

BRIEF DESCRIPTION OF THE DRAWINGS

FIG. 4 shows a shape creation tool;

FIG. 5 shows a particular use of a shape creation tool;

FIG. 6 shows a delete, move, and copy tool;

FIG. 7 shows a color palette tool;

FIG. 8 shows a type style palette tool;

FIG. 9 shows a symmetry clipboard tool;

FIG. 10 shows a tool for transferring object attributes;

FIG. 11 shows a tool for transferring graphical shapes;

FIG. 12 shows a vertex selection tool;

FIG. 13 shows an attribute gesture tool;

FIG. 14 shows a color and shape creation gesture tool;

FIG. 15 shows an alignment line tool;

FIG. 16 shows a shape placement tool that snaps to objects;

FIG. 17 shows a rotation tool;

FIG. 18 shows a rotation, scaling and skewing tool;

FIG. 19 shows a tool for activating alignment objects;

FIG. 20 shows a grid tool;

FIG. 21 shows a custom grid tool;

FIG. 22 shows a geometric measurement tool;

FIG. 23 shows a text format revealing tool;

FIG. 24 shows a gesture-interpreting tool;

FIG. 25 shows a control handle tool;

FIG. 26 shows a debugging tool;

FIG. 27 shows a numeric keypad tool;

FIG. 28 shows a text creation and text rotation tool;

FIG. 29 shows a figure labelling tool;

FIG. 30 shows a tool for loading documents into windows;

FIG. 31 shows a tool with handles for moving, copying, and deleting the tool;

FIG. 32 shows how tools may be composed to create new tools;

DESCRIPTION OF SPECIFIC EMBODIMENTS

The detailed description given below is organized as follows. Section 1 provides a system overview and provides a high-level structural and procedural description of the overlay of the present invention including click-through tools and two-handed operation. Section 2 describes a number of examples of the types of tools that are possible, with an emphasis on click-through tools. Section 3 describes some strategies for organizing, modifying, and creating tools on a sheet or sheets of the overlay and some general techniques for using the overlay that work across a range of different types of tools. Section 4 describes a current implementation of the overlay. Section 5 describes some of the advantages of the overlay over existing techniques. Section 6 concludes the description. Section 7 provides a list of articles mentioned in the specification.

The disclosures of all articles and references, including patent documents, mentioned in this application are incorporated herein by reference as if set out in full.

1.0 System Overview

Figure 1:
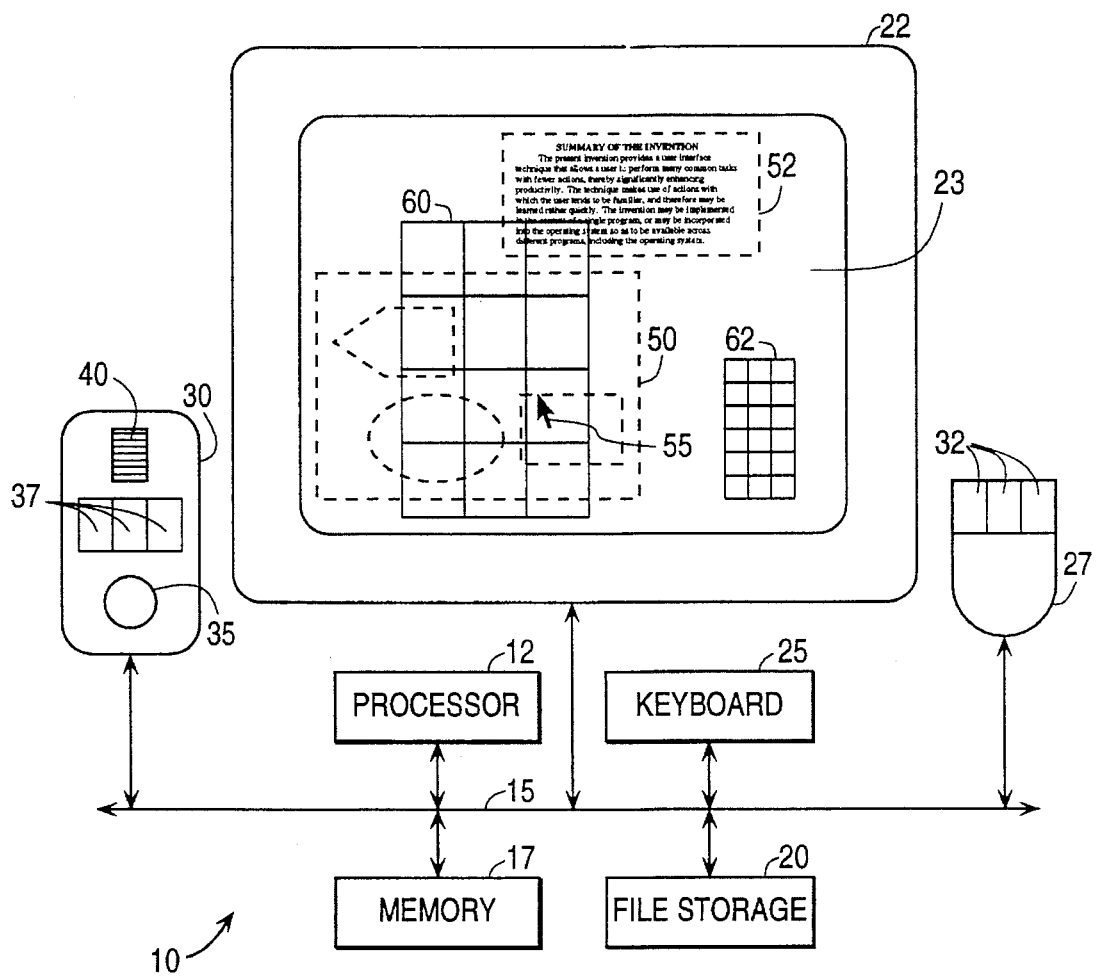
FIG. 1 is a block diagram of a computer system embodying the present invention.

FIG. 1 is a block diagram of a computer system 10 embodying the present invention. In accordance with known practice, the computer system includes a processor 12 that communicates with a number of peripheral devices via a bus subsystem 15. These peripheral devices typically include a storage facility including a memory 17 and a file storage system 20, a number of input devices, and a display 22 device having an active display area 23. The file storage system stores program and data files, and typically includes such standard devices as hard disk drives and floppy disk drives, and possibly other devices as CD-ROM drives and optical drives.

In this context, the term "bus system" is used generically so as to include any mechanism for letting the various components of the system communicate with each other as intended. With the exception of the input devices and the display, the other components need not be at the same physical location. Thus, for example, portions of the file storage system could be connected via various long-distance network media. Similarly, the input devices and display need not be at the same location as the processor, although it is anticipated that the present invention will most often be implemented in the context of PCs and workstations.

The input devices are for the most part standard, including a keyboard 25 and one or more pointing devices. A mouse 27 and a trackball 30 are shown, but other devices such as touch screens, graphics tablets, or electronic styluses could be used. While there may be instances in conventional systems where there are more than one pointing device, the normal situation is that the user uses only one such device at a time. The present invention derives significant advantages by providing the user with two such devices, one for each hand, for simultaneous or alternating use. For purposes of concreteness, mouse 27 is shown as having three buttons 32, while trackball 30 is shown as having a ball 35, three buttons 37, and a thumbwheel 40.

The invention can be described at a high-level user point of view with reference to the illustrated contents of display area 23. The display shows a first application window 50 for a drawing program and a second application window 52 for a word processor. The drawing window is shown as having three graphical objects, a rectangle, an ellipse, and a pentagon; the word processor window is shown as having text. An arrow-shaped cursor 55, the position of which is controlled by mouse 27, is shown as positioned on the outline of the rectangle in the drawing window, as might be the case when the user selects the rectangle in preparation for performing a desired operation on it. This is a representative arrangement, for example one that might occur where the user is drafting a patent specification and creating patent drawings.

Depending on the computer and the task at hand, there could be a single window occupying the whole display area, or many windows, possibly with some overlapping.

The computing environment and the contents of the display area, as described above, are standard. The present invention adds another aspect to the environment, a movable transparent overlay having a number of delineated regions 60. The delineated regions are shown as a plurality of abutting rectangles in a multi-element grid, but as will be discussed below, the delineated regions need not abut each other. Moreover, there need not be a plurality visible on the display at the same time. As an aid to distinguishing the delineated regions on the overlay from the remaining items in the display area, items on the overlay are shown in solid lines and the application windows and graphical objects are shown in broken lines. As will be described below, the overlay preferably carries indicia (such as icons or text) specifying the significance of the particular delineated regions. Therefore, while the overlay is referred to as being transparent, it should be recognized that the need to delineate regions on the overlay means that the overlay may have some opaque or semi-transparent portions.

If a given delineated region is positioned over a portion of the display, and an action taken in that region, the action takes on an attribute of the particular delineated region. Thus each delineated region may be thought of as the active region (or active area) of a tool that can be brought to a relevant portion of the display area and applied to that portion. Given the nature of the way such tools are applied, the tools are sometimes referred to as click-through tools. While much of the description that follows treats the overlay as a single transparent sheet, the overlay may comprise what appear as a plurality of relatively movable transparent sheets, each having a number of semi-transparent tools on it.

Having the tools appear on top of the objects to which they are to be applied seems the most intuitive approach, and that approach is what will generally be assumed. However, there may be certain special circumstances that warrant the opposite stacking order. For example, there may be certain applications where it is critical that none of the application objects be obscured, even by the markings on the overlay. This can be accommodated by having the application appear as transparent and having the overlay appear behind the application. As will be described in a later section, the underlying operation of the overlay program will tend to be the same either way. Therefore, the term "overlay" will be used to refer to the collection of tool-bearing sheets, whether they appear above or beneath the other items in the display area. In some instances, it may be desirable to allow the user to switch from one stacking order to the other.

Although there are many ways for the user to position the overlay relative to the display area, it is preferred that this be done with the user's non-dominant hand using trackball 30. Rectilinear positioning may be accomplished by rotating ball 35 while other operations may be effected with buttons 37. Resizing the overlay and its contents may be accomplished by rotating thumbwheel 40.

The click-through tools and the overlay represent elements of a new user interface, but may also be used in conjunction with standard interface elements. By way of example, a stylized tool palette 62 of the type used in many prior art programs is shown. Depending on the program and the OS, tool and attribute palettes for a given program may be rigidly fixed in that program's window, or may appear as a separate window that is movable relative to other windows for the program. While the detailed description of overlay tool examples in the following section deals in large part with click-through tools, conventional tools, such as those in palette 62, can be incorporated onto the overlay and moved along with other tools on the overlay. Palette 62 is shown in solid lines, suggesting that it is on the overlay. The conventional tools can share one or more overlay sheets with click-through tools, or can be segregated on a separate overlay sheet.

Figure 2:
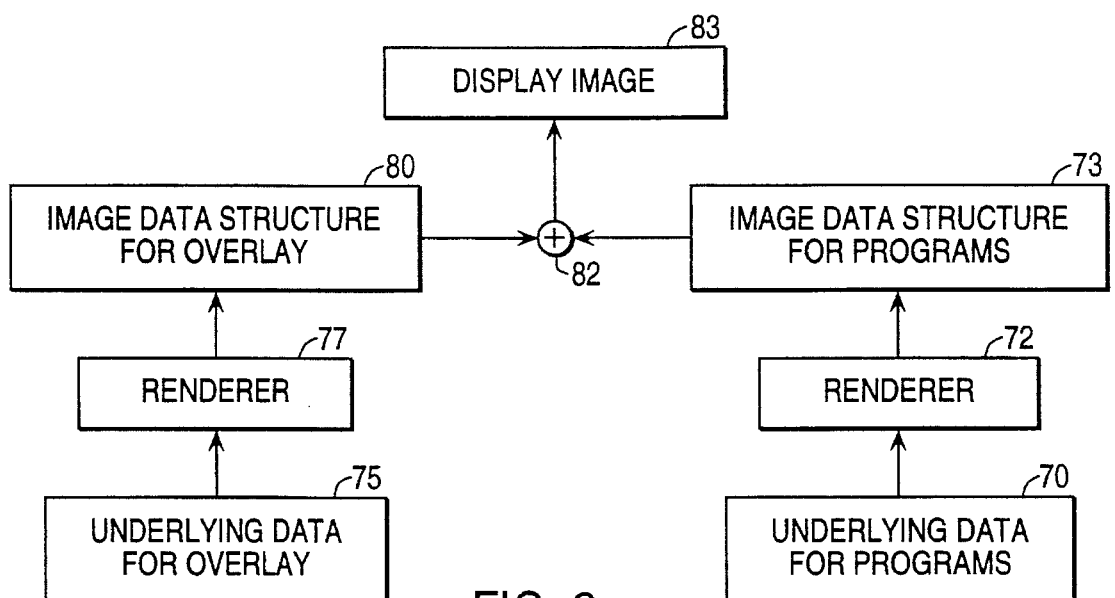
FIG. 2 shows how the underlying data for the program and for the overlay are converted to a visible representation.

FIG. 2 is a flow diagram showing how the various data items stored in memory 17 or file storage system 20 are processed so that they appear in display area 23. The program's underlying data, designated 70, is typically stored in each program's native format, which is a characteristic of the program, and is presumably optimized for that program's operation. The data is subjected to processing by a renderer 72, which converts the data to an image data structure 73 that specifies what is to appear on the display. There are a number of possible formats; for example, image data structure 73 can be a bitmap or a set of commands in a language such as Display Postscript or Quickdraw. Regardless of the details, the image data structure must contain sufficient information that it can be rasterized (if not already a bitmap) at the display resolution or otherwise processed for viewing on the display.

The overlay is characterized by a similar hierarchy wherein the overlay's underlying data, designated 75, is processed by a renderer 77, which converts the data to an overlay image data structure 80. The two image data structures are combined at what is shown schematically as a summing node 82, and converted to the final display image, designated 83. The particular technique for combining the image data structures should ensure that the overlay appear as a transparent sheet with opaque or partly transparent indicia. As will be discussed below, the overlay may include what are referred to as visual filters, or may include tools that incorporate visual filters. In such embodiments, the summing node can also operate to distort or filter portions of the display image. The specifics of the overlay configuration and appearance will be described below in connection with a description of various tool embodiments.

The see-through interface of the present invention requires relative positioning of three conceptual user interface layers: a cursor layer, an overlay layer, and an application layer. The cursor layer, at its minimum, is defined by a distinguished point in the plane (a cursor position), along with one or more visible objects that move rigidly with that distinguished point. The overlay layer, at its minimum, includes a set of tools that move together in a coordinated fashion. The application layer includes one or more programs with visible representations. Each of these layers may in turn consist of sub-layers. For example, the cursor may carry a drag-and-drop object with it; the tools of the overlay may be made by layering simpler tools on top of each other, and the applications may overlap as in an overlapping window system.

Figure 3:
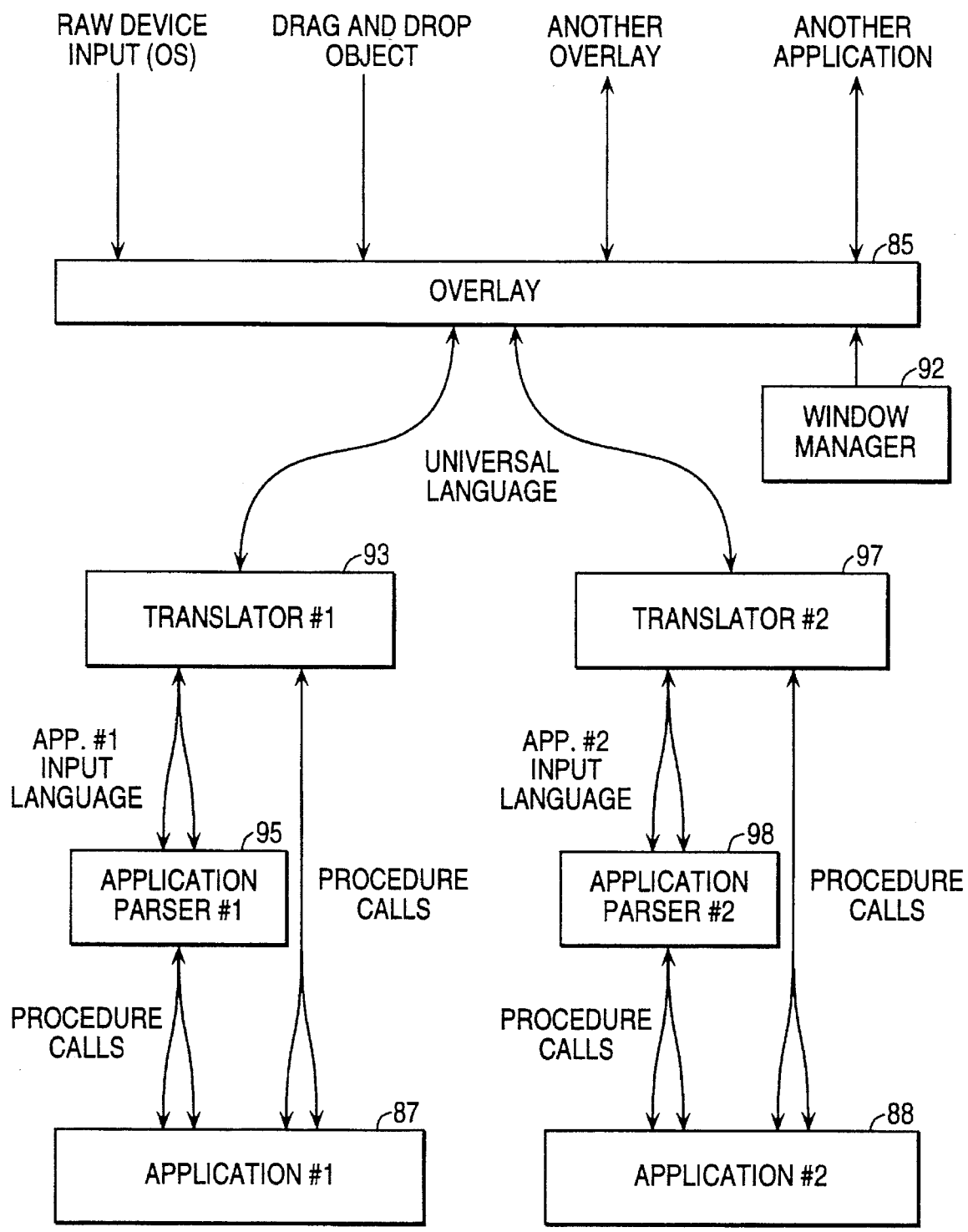
FIG. 3 shows how input signals to the overlay are converted to procedure calls.

FIG. 3 is a flow diagram showing the relation among these three layers and the communication between the overlay, designated 85, and application programs 87 and 88 (also referred to as applications #1 and #2). The communication between the overlay and the applications is the same, regardless of whether the overlay tools appear above the visible representation or below it.

When triggered, the overlay tools deliver commands, which may include arbitrary data structures, to the applications. An application may respond to the command by changing its own data structures, and may also respond by returning data to the overlay. In addition, whenever requested to paint itself, the application responds to the overlay by providing information about its visual representation (current appearance on the screen). The overlay may modify this visual representation (e.g., using visual filters) before presenting it to the user.

The figure also shows a reverse path from the applications to the overlay since the applications return data to the overlay in response to certain commands. Although the specific example discussed below deals with the operation of a click-through tool, the basic description applies to conventional tools on the overlay.

The overlay software operates in conjunction with a window manager 92. The window manager, which may be part of the operating system, draws window frames and oversees the creation, movement, resizing, and destruction of windows on the display. The window manager takes raw input signals from the input devices, routes the signals to the correct application (typically the one whose window is frontmost under the cursor) and translates the position information into coordinates expressed in the application's coordinate system. The window manager also provides information to the application as to where to draw the window contents.

Input signals to the overlay may be raw input signals from the OS (e.g., mouse event coordinates) or may be provided by a drag-and-drop object or by another application. Additionally, for those embodiments that allow the superposition of overlay tools, the input signals may come from what may be viewed as another overlay. An additional set of input signals (not explicitly shown) to the overlay include the signals for positioning the overlay relative to the visible representation.

In the illustrated embodiment, the input signals are translated into commands in a universal language, which are then directed to a translator for the appropriate application. Where the input signal had position information causing commands to be routed to application #1, the commands encounter a translator 93 that converts some of them to commands in the input language of application #1, and some of them directly into calls on the procedures of application #1. Commands in the application's input language are directed to a parser 95, which converts them into procedure calls. The drawing also shows the case where the input signal pertains to application #2, in which case the universal language commands are directed to a translator 97, and possibly then to a parser 98 to generate calls to the procedures of application #2.

The following is an example of the conversion of a command in a universal language to commands in either of two application languages. Consider the example of a paint program that operates on bitmaps and a draw program that operates on vector objects. Further consider the case where the overlay tool that is under the cursor specifies changing an entity's color to red. Typically a command will include an operator, a set of position information, and possibly one or more parameters. Examples of commands in the universal language could include the following:

SetColor <x, y> red,

SelectCorner <x, y>, and

Scale <x, y><x', y'>2.0.

Consider the SetColor command. For the paint program, which operates on pixels, the cursor position provides all the position information necessary to determine the required action, and a single command is all that is needed. The relevant single command in the paint program's language might be the following:

SetColorPixel <x, y> red.

For the draw program, it would first be necessary to determine, on the basis of the cursor position, which object is selected, and then apply the color to that object. The relevant command sequence in the draw program's language might be the following:

SelectObject <x, y>
SetColorSelectedShape red.

If the operation had been performed with a conventional tool on the overlay for setting the selected object to red, the command sequence would be the same, but would have come about in two stages, first when the user had selected the object in the conventional way, and then when the user clicked on the red button in the conventional color palette.

A variation on this arrangement would be to have the overlay and the application translators tightly coupled so as to avoid the conversion of input signals to commands in a universal language. Rather, the overlay would have to maintain information as to which applications it supported, and would translate input signals directly into the appropriate application's input language.

2.0 Overlay Tool Examples Overview

For the overlay to be useful, it must contain a set of tools that help the user make use of an application. A number of these tools are described below. Some of them are novel in their own right. Others are novel only in the context of the overlay. Most of the tasks performed by the non-dominant hand can also be performed by the dominant hand, at the cost of having the dominant hand interrupt its current task. There are, however, certain tasks that require the use of both hands. Many of the tools described below are click-through tools. As alluded to above, the term refers to the fact that the tool is applied by clicking through the tool on a visible portion of the visible representation.

These tools have a number of interesting properties including the following. They often allow several interaction steps to be collapsed into one. The user's eyes need never leave the work area. The interface is direct, visual, and, with carefully chosen tools, easy to learn. The user's non-dominant hand is responsible only for coarse positioning; fine positioning is done with the hand that holds the mouse. The examples are primarily directed to a drawing program (graphical editor) environment with tools for creating, modifying, and deleting graphical objects in a scene.

The operation of most of the tools will be described in connection with a figure that includes a series of views, indicating the appearance of the drawing scene, and in some cases that of the tool, at the different stages of the operation. For some of the examples, a given operation using a tool of the present invention will be contrasted to the same operation using conventional drawing program tools and techniques. With the exception of FIGS. 8, 13, and 23, objects in the scene are drawn in dashed lines and overlay tools are drawn in solid lines, consistent with the convention adopted in FIG. 1.

References to a specific type of program or editor are not intended to imply stand-alone application programs. In fact, many so-called drawing programs have very sophisticated text handling capabilities, and many so-called word processors have powerful drawing modules. The demarcation is further blurred by integrated program packages (so-called "works" programs) that provide the functionality of many types of program in a single program. Accordingly, reference to a given type of program should be taken as a reference to a program having the stated functionality, whether marketed as a drawing program, a word processor, a database program, or a spreadsheet.

A number of the tools are described in conjunction with a graphical editor that supports a feature referred to as "snap-dragging." This refers to a gravity technique described in the Bier and Stone paper on snap-dragging [*Bier86]. In connection with this technique, a special point, referred to as the "caret," snaps to gravity-active locations, such as object corners, and other objects, as they are drawn, may snap to the caret.

The terms "button," "menu," and "palette" are used in connection with a number of the tools to be described below. The terms are used in general accordance with their known meaning, but some departure is sometimes necessary in view of the fact that the overlay of the present invention imbues these otherwise familiar devices with new properties. In general, a button refers to a defined area on the display, which when clicked, causes an operation to occur. Some of the buttons used in the overlay allow the user to control the particular result by clicking at a particular location on the button. In general a menu (often preceded by the adjective "pull-down" or "pop-up") is a list of items or properties that the user can select by clicking the menu bar or menu icon and dragging to the desired item. The term palette refers to a visible collection of buttons where one or more can be selected by clicking.

A tear-off menu, in effect, substitutes a palette for a pull-down or pop-up menu. Thus, menu selection involves the single step of selecting the menu item, rather than the compound step of selecting the menu from the menu bar, and then selecting the menu item. The term "palette menu" is used below to denote a palette or tear-off menu that is movable with the non-dominant hand, and so can be brought into the work area and then moved away without distracting the user from the main task at hand.

Some of the specific tools described below make use of what is referred to as a visual filter, a filter, or a lens. This refers to a technique described in a commonly-owned copending application of Maureen C. Stone, Eric A. Bier, and Anthony DeRose, entitled "USER-DIRECTED METHOD FOR OPERATING ON AN OBJECT-BASED MODEL DATA STRUCTURE THROUGH A SECOND CONTEXTUAL IMAGE," filed concurrently herewith U.S. application Ser. No. 08/095,974.

In brief, the system described in the referenced application provides the user with visual filters. Each filter is a screen region, called a viewing region, together with an operator, such as operations that magnify, render in a wire-frame style, or reveal the hidden equation in a spreadsheet cell, performed on shapes viewed in that region. These filters generalize to many representations other than pixels and to many operations other than magnification. To produce their visible output, these filters may make use of the original application data structures from which the current visual representation is produced. Thus, these filters can portray the application data structures in a substantially different format, highlighting information that was previously more difficult to see, suppressing information that is not currently relevant, or even revealing information about parts of the data structures that were not previously displayed. Such visual filters work in concert with overlay tools, particularly tools that perform operations relevant to the parts of the data structures that are revealed or highlighted by the visual filters.

Visual filters may produce not only modified views of application data structures, but also temporary overlay tools, positioned relative to particular application shapes. The user may use these temporary tools in the same way as other tools on the overlay; for example, these tools may include buttons that the user can click on, click through, or drag to cause commands to be delivered to the underlying application.

When several filters are composed, the effect is as though the model were passed sequentially through the stack of filters from bottom to top, with each filter operating on the model in turn. In addition, when one filter has other filters below it, it may modify how the boundaries of these other filters are mapped onto the screen within its own boundary.

2.01 Pushing and Shaping Objects into the Scene

Figure 4:
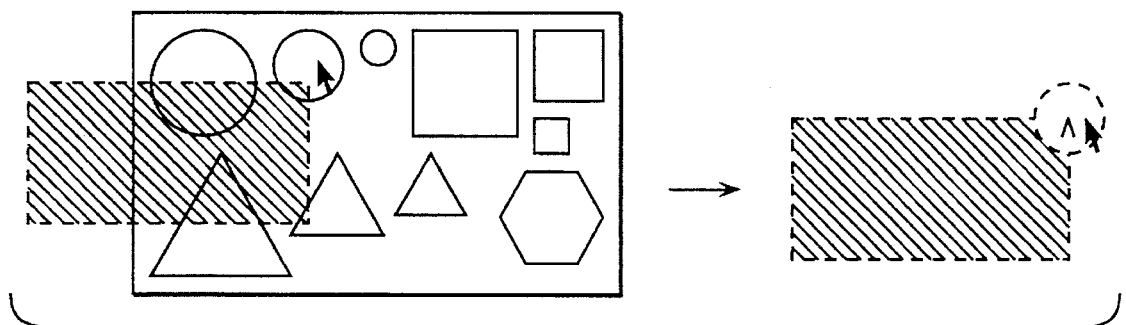
FIGS. 4–32 are single views or sequences of views showing the operation of a number of tools including click-through tools.

FIG. 4 shows how adding a new shape to a graphical scene is done using a shape palette on the overlay. The user has coarsely positioned a circle on the tool near a rectangle in the scene. When the user pushes and holds the mouse button, a new circle of that size is created in the scene, the overlay disappears and the circle attaches its center (for instance) to the cursor arrow for fine positioning. Using a gravity technique such as snap-dragging [*Bier86], the new circle can be placed so that its center lies exactly on the corner of the rectangle. When the user releases the mouse button the new shape is at its final position, and the tool reappears. If the user had placed a shape with several corners, such as a triangle, the corner nearest to the cursor when the mouse button went down would have been the point that attached itself to the cursor.

In the previous example, the size of the object in the menu determined its size when it was applied to the application. In many situations, such as when selecting lines, rectangles, circles, and other shapes, one wants to select the generic shape and then specify its size and position. The overlay enables a novel technique that takes advantage of the ability to use both hands to perform the selection, positioning and scaling tasks in a fluid, natural manner.

Figure 5:
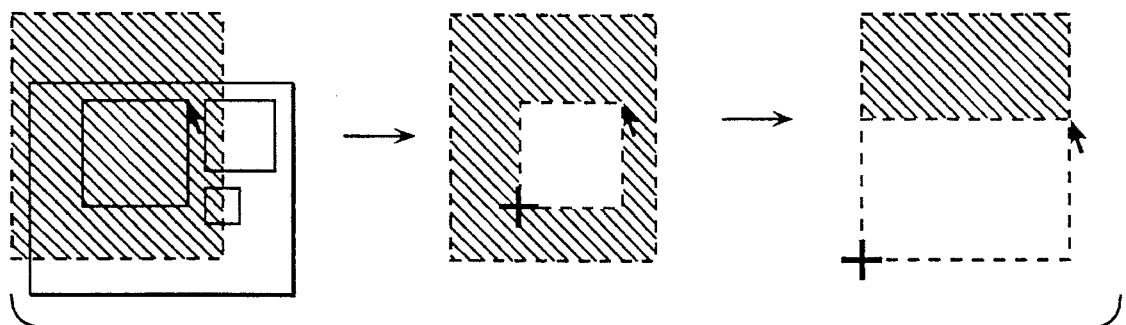

FIG. 5 shows a variation on rectangle creation that allows all four edges of the rectangle to be placed at once. Initially, the non-dominant hand has positioned a rectangle on the tool over a rectangle in the scene. The user clicks the tool rectangle with the mouse cursor and depresses a mouse button to create a rectangle of that initial size and position in the scene. The tool disappears. The rectangle corner nearest the mouse cursor snaps to that cursor. A new cursor appears at the opposite corner of the rectangle; the position of this new cursor is controlled by the non-dominant hand. Both corners of the rectangle can be positioned simultaneously and snapped into place using snap-dragging. When the mouse button is released, the rectangle is placed and the tool reappears. This two-handed creation technique can be used to position other shapes, including both endpoints of a straight line segment, the center point and a circumference point of a circle (allowing the circle to be simultaneously translated and scaled), two corners of a triangle (allowing the triangle to be simultaneously translated, rotated, and scaled).

2.02 Click-Through Buttons

In most user interfaces, the text describing the operation a button performs is placed within the active region of the button itself. However, on the overlay, it is often preferable to have a transparent active region, with text, an icon, or other visible indicium indicating the operation near the active region. This allows the user to apply an operation to the objects that are visible within the button. Each active region is referred to as a click-through button. Click-through buttons can also be used to pick up object properties.

Figure 6:
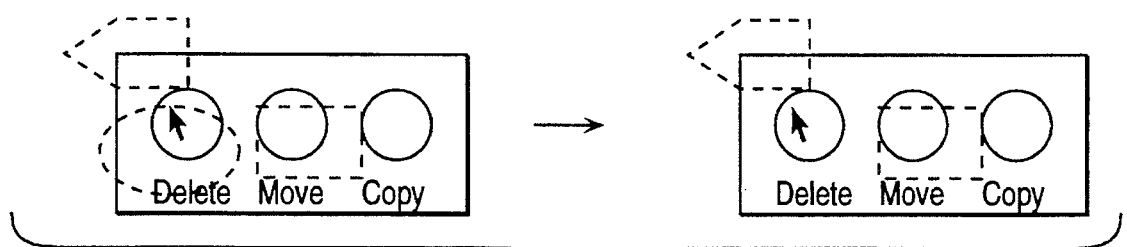

FIG. 6 shows click-through buttons for Delete, Move, and Copy operations, and the sequence of operations for deleting an object (the ellipse) from the scene. The user positions the overlay so that the Delete button is over a group of objects, while pointing at one of these objects with the cursor. In certain implementations, while the mouse button is down, the system highlights the object that will be operated upon if the mouse button is released at the current time. When the user releases the mouse button, the selected object is deleted. While several objects intersect the Delete button, only the object that the user indicates with the mouse cursor is actually deleted. This allows precise specification of operands. Also, click-through buttons allow the user to select an operation and an operand in a single two-handed gesture. If the user had wished to perform a different operation, a different click-through button could have been used.

Figure 7:
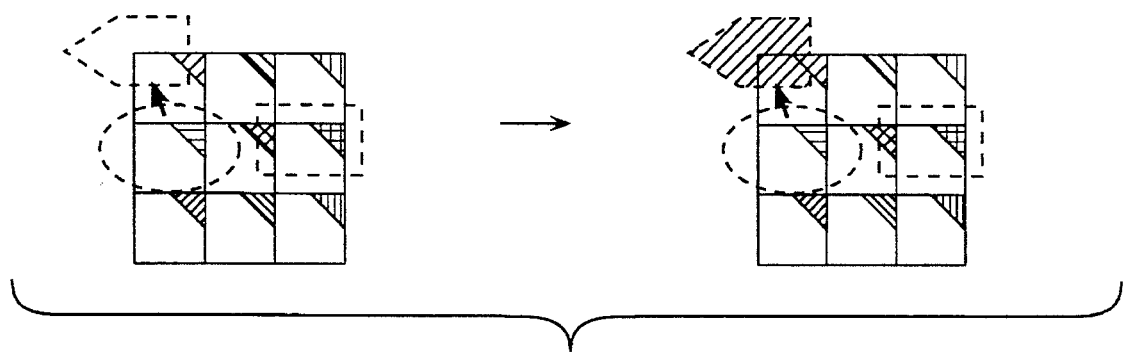

FIG. 7 shows an array of click-through buttons used as a color palette, and the sequence of operations for changing the color of an object in the scene (the pentagon). In this case each button is a rectangle with a triangular region in the upper right corner designating the color (different colors are denoted by different hatch patterns). The user positions the part of the color palette having the desired color over the pentagon and clicks on it with a mouse. Although the ellipse is also under the relevant button, only the pentagon, which the user indicates with the mouse cursor, has its color changed. (If the user clicks through the button on a region devoid of objects, the program could ignore the action, or could interpret the action as setting a default value.) In a conventional drawing program, the user would move the cursor to the object whose color is to be changed (possibly after first performing an action such as moving the cursor to the tool palette to obtain the selection tool), click on the object to select it, and move the cursor to a color palette or menu to select the desired color.

The color palette buttons are shown as abutting each other, but they could be separated from each other as in the case of the Delete, Move, and Copy buttons. Further the colored regions on the buttons are shown as opaque, but might just as well be transparent. If the color regions are transparent, they can cover the entire button area. A similar array of click-through buttons could be provided for changing the outline color of an object. The color for a given button could be denoted as above, but with the color only applied to the perimeter of the triangular region, or by having the color applied to the entire perimeter of the button.

Figure 8:
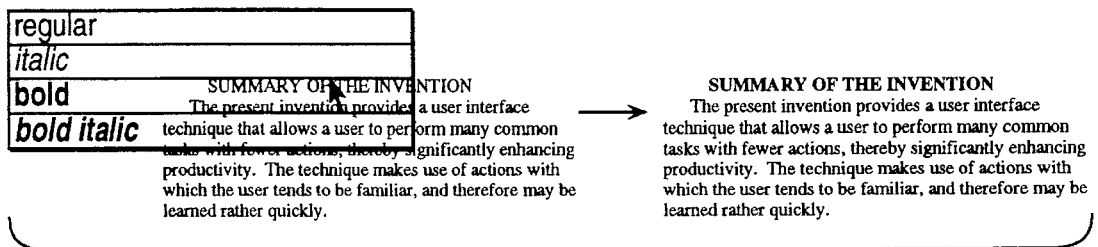

FIG. 8 shows an array of click-through buttons used as a property palette for setting the style of text in a document. Each style (regular, bold, etc.) has an active area on the tool. In this particular example, the text describing the function of the button is located in the active area. Selecting the text displayed in this area changes its style. In the example shown, the user is selecting text within the "bold" button, with the result that the selected text is converted to boldface. The particular event that the program recognizes as selecting text is not important, so long as the event begins in the desired button. If the mechanism for selecting text is dragging the cursor over the text to be selected, the user would position the starting point for selection in the active region, depress the mouse button, drag to complete the selection, and release the mouse button. The fact that the cursor would likely be outside the active region when the mouse button is released does not matter.

2.03 Clipboards

Clipboard tools pick up shapes and properties from underlying objects, acting as visible instantiations of the copy and paste keys common in many applications. Clipboards can pick up entire objects or specific properties such as color, dash pattern, or font. They can hold single or multiple copies of an object. The objects or properties captured on the clipboard can be copied from the clipboard by clicking on them, as in the palette tools. In a sense, the object or attribute that is picked up by a clipboard tool becomes a part of the tool. This is but one instance of the general feature, to be discussed in detail in a later section, of allowing the user to customize the overlay.

Figure 9:
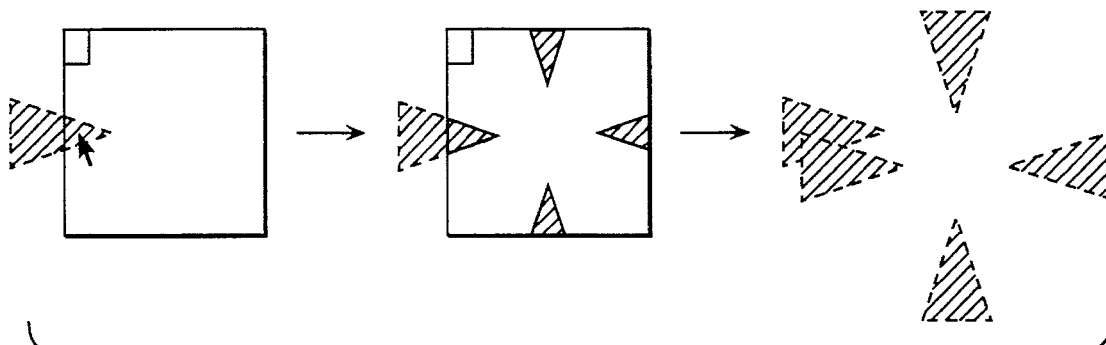

FIG. 9 shows the operation of a symmetry clipboard that picks up the shape that the user clicks on and produces all of the rotations of that shape by multiples of 90 degrees. Moving the clipboard and clicking on it again, the user drops a translated copy of the resulting symmetrical shape. Clicking the small square in the upper left corner of the clipboard clears the clipboard so that new shapes can be clipped.

Figure 10:
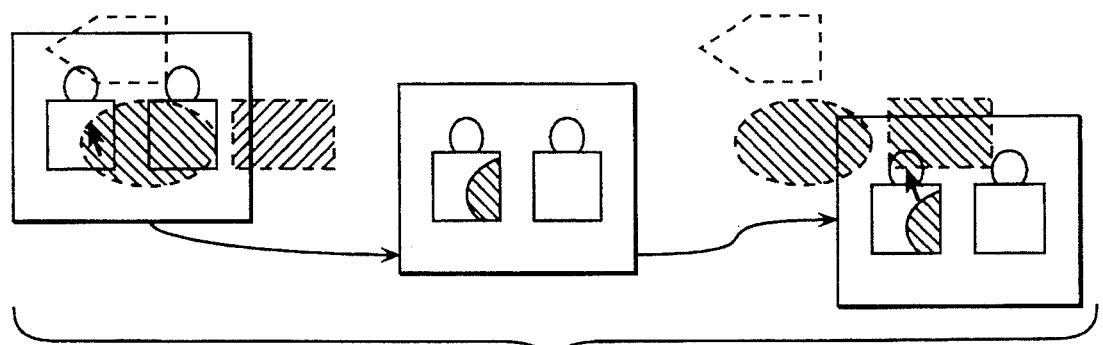

FIG. 10 shows a pair of tools that can both pick up the graphical properties of an object and apply those properties to other objects. The particular illustrated sequence is transferring the color of the ellipse to the rectangle. These tools can be thought of as rubbings because their use is reminiscent of the paper sheets and charcoal used to rub off words and text from monuments. The user clicks on the ellipse through a rubbing sheet that is sensitive to the area color of objects. That area color is "lifted up" from the picture (or really copied as the color of the circle is unchanged) to become part of the rubbing sheet. Even part of the shape of the circle is retained as a remainder of where this color came from.

The user then takes the rubbing and positions its circular tab, which acts as a property applicator, over a rectangle. When the user clicks the mouse, the rectangle takes on the color from the rubbing sheet. The second rubbing sheet could be used to lift a second fill color from a different object, making it possible to store several colors for later application.

Figure 11:
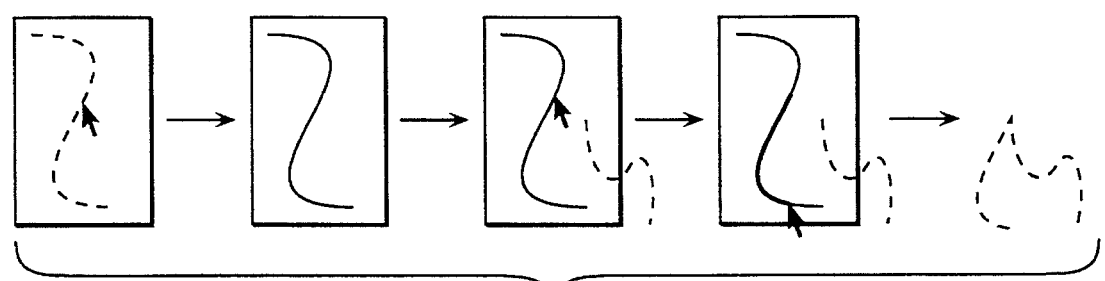

FIG. 11 shows the operation of a tool that allows the user to copy a shape of an underlying object, and then transfer selected portions of that shape back to the application. The user clicks the object (in this case a curve) through the tool, at which point the curve or a copy of the curve becomes part of the tool. Later, when the user is drawing a new shape, the tool can be used in the manner of a French curve. Specifically, the user positions the tool near a portion of the new shape, clicks two points on the curve to specify which portion of the curve is to be added to the new shape (the specified portion may become highlighted or change color), and the selected portion is added to the nearest end of the new shape.

2.04 Click-Through Buttons with Visual Filters

In the click-through buttons shown above, the active area of each button was completely transparent, showing the objects underneath the button just as if the button weren't there. However, for many applications it would be advantageous to show a view of the objects under the button that highlights information needed to successfully perform the operation. This can be accomplished using a visual filter, as described above.

Figure 12:
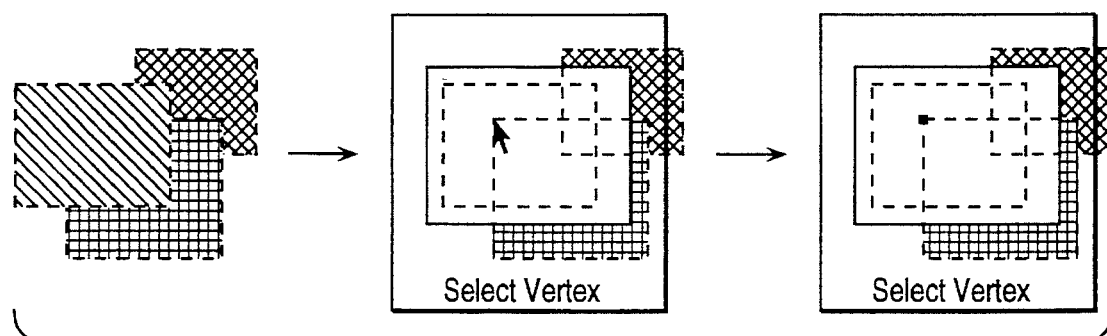

For example, in FIG. 12, the user is confronted with a number of stacked rectangles and wishes to select the upper left hand corner of the middle rectangle. This corner is hidden by the topmost rectangle, so it is hard to point at. However, a tool having a Select Vertex button shows a wireframe (line-drawing) view of the picture that exposes this corner, making it easy to select.

The combination of visual filters with the overlay tools can be especially advantageous. In a conventional drawing program, to produce a wireframe view of the picture, the user would have to explicitly evoke a separate command. Once this command was given, all objects would be drawn as wireframe drawings, not just the objects to be operated upon. This might lose context that is crucial to helping the user identify the correct objects to operate upon. Here on the other hand, the user summons a local viewing operation, an editing command, and an operand all in a single two-handed gesture.

2.05 Combining the Overlay With Gestures

The overlay technique of the present invention can be combined with just about any existing user interface technique, and the combination may produce a tool with interesting properties.

One such interface technique is the use of what are referred to as gestures, which are typically one or more strokes with a pointing device. A gesture is typically characterized by one or more feature points (e.g., beginning and end points of the stroke path, intersection point of two strokes).

Figure 13:
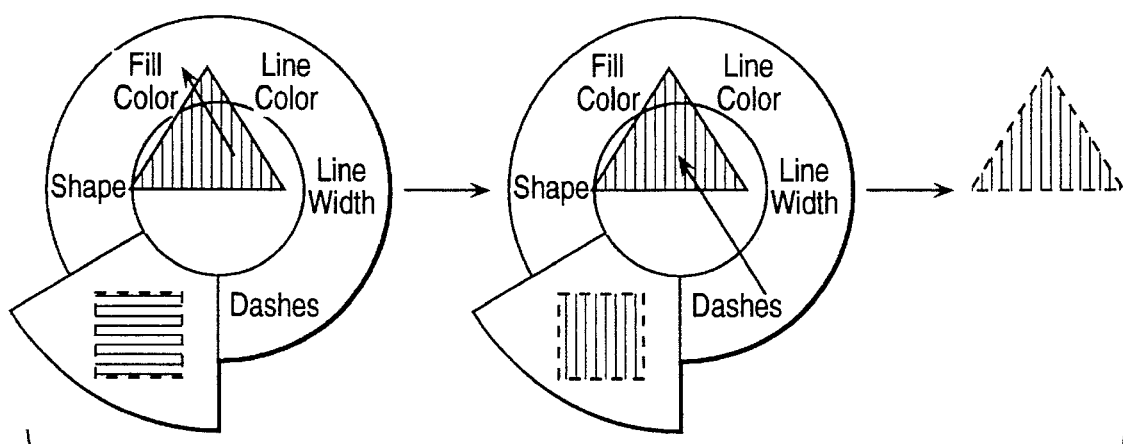

For example, FIG. 13 shows operations using a tool that combines single-stroke gestures and pie menus with the overlay. The tool provides a central active area (scene region) surrounded by a number of attribute menu segments and a region for holding a prototype object.

Initially the prototype object, which is part of the tool, is a rectangle with a dashed outline and a first fill color. The user positions the central area of the tool over a triangle in the scene having a solid outline and a second fill color. By stroking (dragging the cursor) from the triangle to the "Fill Color" menu region, the user indicates that the fill color of the triangle should be applied to the prototype object. At this point, the prototype object has been recolored. However, this pie menu can also be used in reverse to apply properties from the prototype object to scene objects. For example, when the user strokes from the "Dashes" menu region to the triangle, the dash pattern of the prototype object is applied to the triangle.

Different pie menus could be constructed that allow not only individual properties, but arbitrary groups of properties, or even entire shapes, to be applied to the scene. For example, stroking from the prototype object region to the scene region might either apply all of the properties of the prototype object to the indicated object, or might copy the prototype object itself into the scene.

A pie menu that can be used from the center out, or from the outside in, appears to be a novel invention in its own right. However, it would not make much sense out of the overlay context. Single-handed pie menus pop up, centered on the beginning of a stroke, once that stroke has begun [*Hopkins91]. Thus, there is no easy way to stroke from the outside in. However, because the pie menu is on the overlay, the menu appears before the stroke begins, and stroking inwardly is possible. The idea of stroking into a button and out of a button is not limited to circular arrangements such as pie menus. Any style of button could potentially allow this capability.

Figure 14:
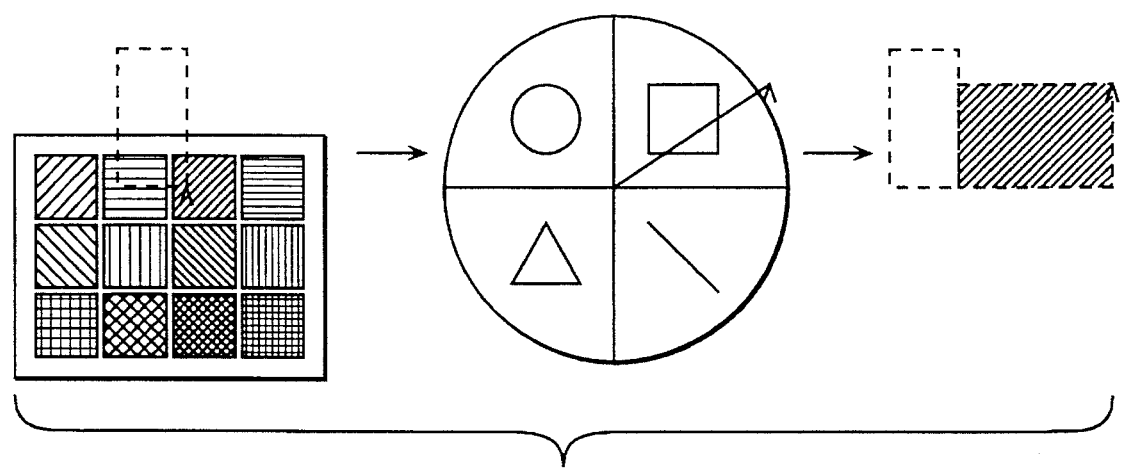

FIG. 14 shows a way that the overlay can be combined with the single-stroke gestures of Kurtenbach and Buxton [*Kurtenbach91] to form a shape creation tool. While this figure shows a tool consisting of a palette of colors, a design like that in FIG. 7 could also be used. The user positions the cursor at a desired position in the drawing, and moves the button having the desired color under the cursor. By beginning a stroke on a particular color button, the user tells the system to create an object of that color. The direction of the stroke determines the shape that will be created; the length of the stroke the size. Once the stroke is started, the overlay disappears and a pie menu of shapes appears, reminding the user which directions correspond to which shapes. Once the stroke is completed, a new shape is added to the scene. As Kurtenbach and Buxton describe, there are many ways to speed up this interaction further. For example, if the user makes the stroke quickly, the pie menu need not appear.

Notice that this tool allows a user to specify the position, color, size, and shape of a new object in a single short two-handed gesture. In a conventional drawing program, the user would first move the cursor to the tool palette to select the rectangle tool, move the cursor back to the desired starting position, draw the rectangle at the desired location and size, and move the cursor to a color palette or menu to select the desired color. The conventional color palette might look like the array of click through buttons in FIG. 7 or FIG. 14, although the conventional palette would not normally be transparent.

2.06 Snapping the Overlay Tools to the Scene

In the examples above, the motion of the overlay over the scene was independent of the content of the scene. However, the present invention also provides useful tools that automatically reposition themselves (or the whole sheet of the overlay) to line up with one or more objects in the scene. The examples show that the non-dominant hand can be used to snap special objects onto scene points while the dominant hand is free to perform (or get ready to perform) other interactive operations.

Figure 15:
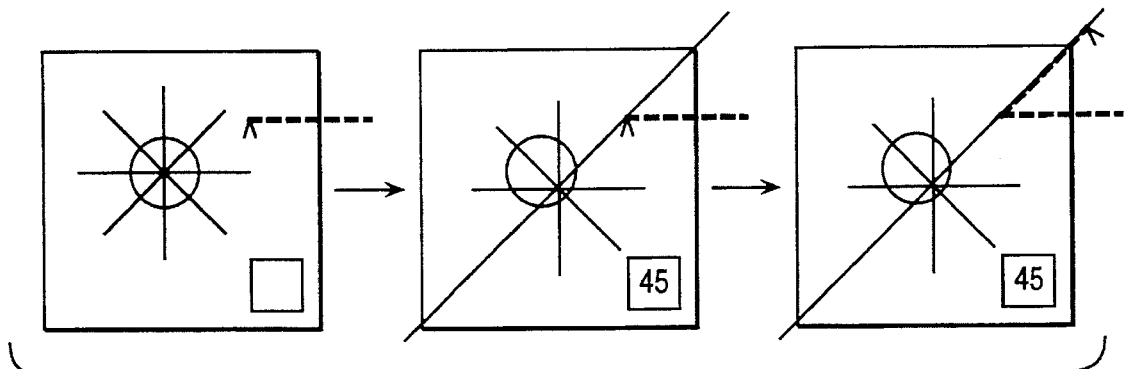

For example, FIG. 15 shows a tool used to create alignment lines for ruler-and-compass style construction, such as that used in snap-dragging [*Bier86]. The tool has a number of alignment lines passing through a common point (the center of a circle) at different angles. The tool also has a small region for displaying an active angle. When one of the alignment lines (e.g., the line at 45 degrees) passes near a software cursor (e.g., the snap-dragging caret shown in the figure), that line snaps to the caret and lengthens, and the tool displays the slope of the selected alignment line. The user can then freeze this line in place (e.g. by clicking a trackball button, or by clicking on the circle in the middle of the tool with the mouse). Finally, the user can perform new operations that snap the caret to the alignment line. The figure shows drawing a new line segment using the alignment line as a guide.

Figure 16:
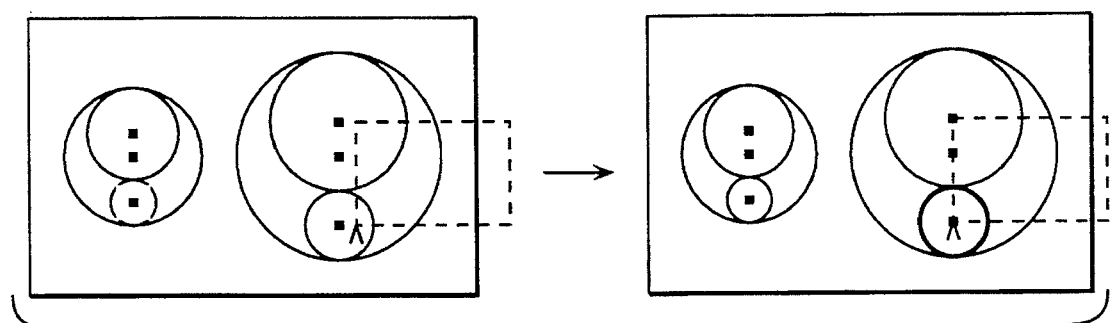

The snapping technique can be used for other alignment objects beside lines. FIG. 16 shows a palette of alignment circles positioned over an illustration in which the caret has been placed at the lower left corner of a rectangle. When the center of one of these circles (e.g., the small circle within the large circle on the right) passes near the caret, the circle highlights by changing to a different color and the center of the circle snaps precisely to the tip of the caret. In this example, the entire palette snaps, but it is also possible to have only the single circle move temporarily away from the other circles in the palette.

Figure 17:
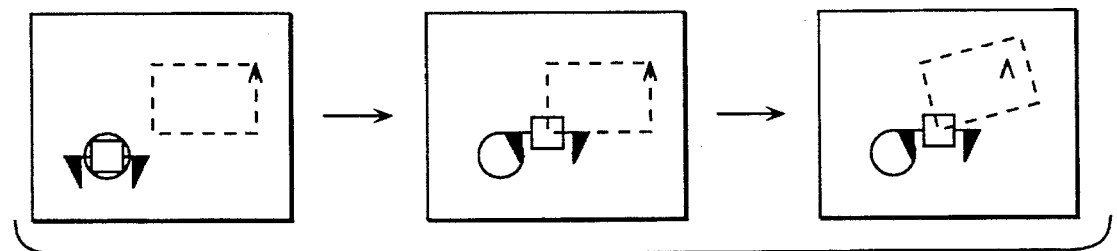

The user might also snap a tool to an arbitrary scene point rather than to a special point such as the caret tip. For example, the tool in FIG. 17 is an anchor object, used in snap-dragging as a center of scaling or a center of rotation. Here, the user moves the overlay until the anchor is near a rectangle corner. Without moving the rest of the overlay, the anchor moves to snap to the rectangle corner. The user freezes the overlay, and with the dominant hand, rotates the rectangle around the anchor.

Figure 18:
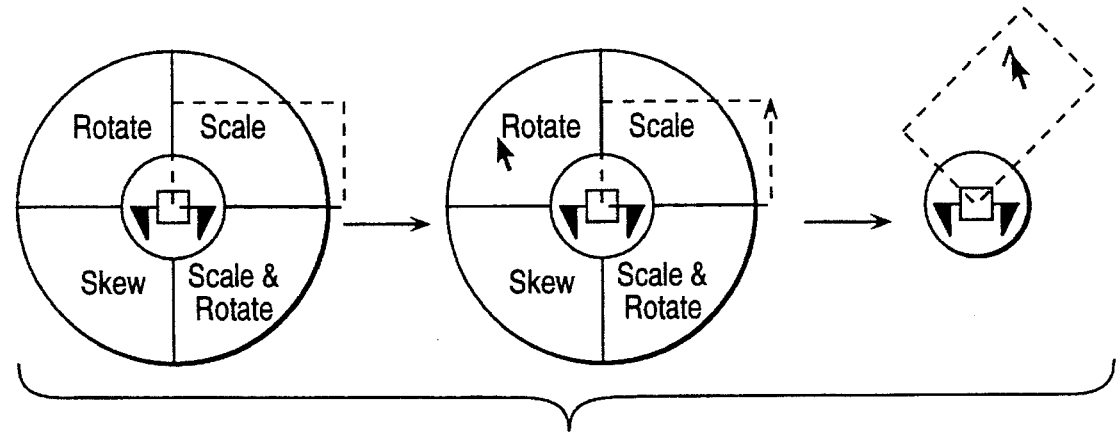

FIG. 18 shows a tool that generalizes the rotation tool of FIG. 17 to perform any of rotation, scaling, and skewing. This tool allows the placement of an anchor position, the selection of an interactive operation, and the performance of that operation in a single two-handed gesture. Specifically, a pie menu of operations is located around the anchor itself. Again, assume that the user has caused the anchor to snap to the rectangle corner. The user begins an operation by clicking the mouse button with the cursor over the name of an operation, say the rotate operation. Once the mouse button is depressed, the system rotates the object as described in the Bier and Stone paper on snap-dragging [*Bier86]. In particular, the angle by which the object is rotated from its original position is kept equal to the angle through which the caret has been moved, using the anchor as a center of rotation. During the interactive operation (rotation in this case), the overlay preferably disappears.

The above tools that snap to scene objects are also examples of using the overlay to provide the user with virtual drafting tools, such as a virtual ruler, compass, or protractor. As with the corresponding physical tools, the non-dominant hand can control the position and orientation of the tool, while the dominant hand is used to create objects or lines. As with the physical tools, objects or edges that are created in proximity of the tool are affected by its constraints. One benefit of using the overlay for this application is that constraints can be brought in and out of effect quickly and easily, much as in the case of the palette menus.

2.07 Combining On/Off Buttons with Palette Menus

Many systems have modes that can be turned on and off by pressing a button whose state toggles. Such buttons can be placed on a palette menu as well, making it possible to reduce cursor travel to these buttons by positioning them near the cursor with the non-dominant hand, and making it unnecessary for the user's gaze to move from the work area. Also, because palette menus can be large (they need not fit on the screen all at once, being easy to scroll on and off), larger more expressive representations of the on/off buttons can be used.

Figure 19:
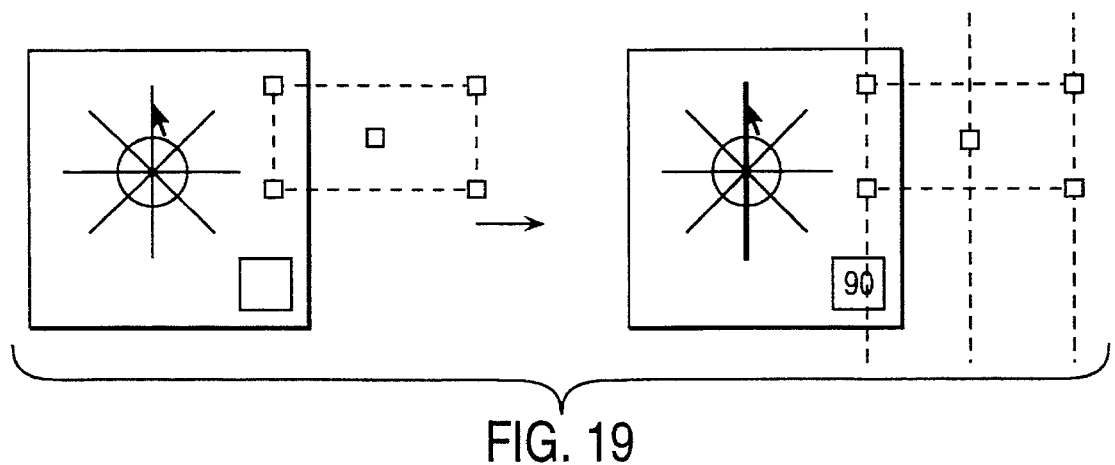

For example, FIG. 19 shows a set of on/off buttons that are displayed as lines at different angles, where the user can activate a class of snap-dragging alignment objects. A rectangle in the scene has its four corners and center point identified as hot points. When the user clicks on a given alignment line (e.g. the vertical line), the line highlights, and all objects with hot points trigger full-length alignment lines of this class, namely vertical alignment lines. The tool is shown as also providing a numeric indication (in a box at the lower right) of the angle of the selected alignment line. If the user had selected alignment lines at more than one angle, the numeric indication would not be shown.

2.08 Guidelines and Grids as Ghosts

Section 2.04 described the combination of the overlay with visual filters. In those examples, the visual filter presented scene objects in different ways to facilitate operations on those scene objects. However, visual filters can also be used to show objects that are not normally shown at all and to make it possible to interact with those objects. For example, a visual filter can be used to locally show guidelines or a grid.

Figure 20:
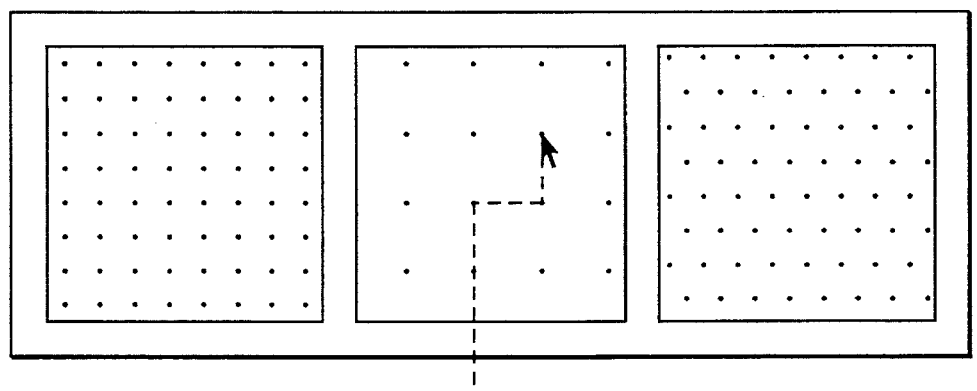

FIG. 20 shows three tools, each of which displays a different kind of grid. The first two grids on the left are rectangular with different spacings. The last grid is a hexagonal grid. Although each grid only appears when the visual filter is in place, the coordinates of the grid are bound to the scene, so that grid points do not move when the overlay moves. Thus, by clicking on the grid points and moving the overlay, the user can edit the scene using these grids. The user has started a line on a grid point, moved the overlay up, and finished the line using the grid. In conventional programs, the effect of turning on a grid becomes apparent only once the grid is turned on. With these tools, however, the user can see what kind of grid any given tool will provide before using it. All of the visual filter tools have this property to some extent.

Figure 21:
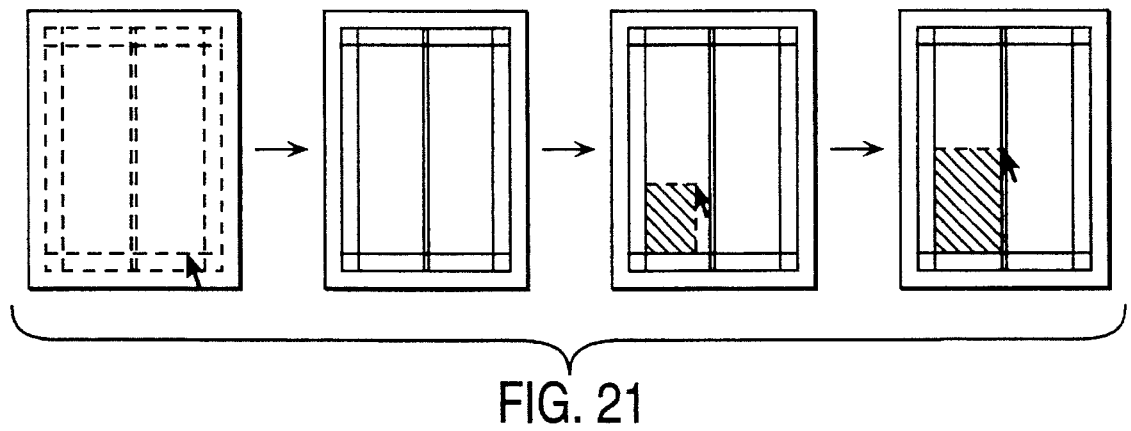

FIG. 21 shows how a user can make and use a customized grid tool. The customized grid tool picks up a set of selected shapes and allows the user to use them as a customized grid. Like other grids, this grid can be used to precisely place objects. This tool makes use of the properties of the overlay discussed above in Section 2.03 on clipboards. The lines in the scene are a grid that the user has created (e.g., using an editor) for specifying a template for a two-column layout. The user lifts this grid onto the customized-grid tool, whereupon the grid lines become a part of the tool. However, as with the grid tools discussed above, the grid lines maintain their position even if the tool is moved, so they remain as reliable reference points. As a result, the grid lines only appear when the grid tool is present. The figure shows the user commencing to stretch a rectangle, and finally snapping the rectangle into place in the lower portion of the left column.

One possible extension is to allow any scene object to be lifted out onto the overlay from the application. This object would then become gravity active, so that scene objects would snap to it, allowing users to create their own customized guiding lines and curves.

2.09 Measuring and Defining Tools

Figure 22:
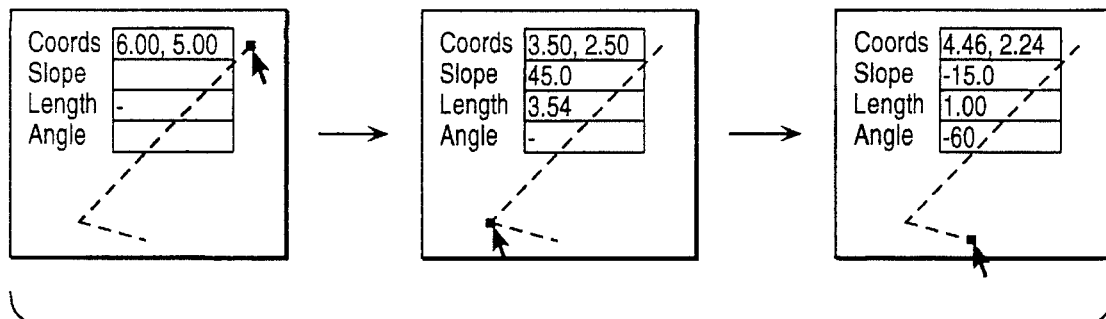

Certain of the tools described above extract graphical properties of objects. FIG. 22 shows the use of a click-through button tool that measures geometric properties, namely coordinates, lengths, slopes, and angles. When the user clicks on an object corner through this tool, the coordinates of that corner are reported. If the user clicks again, the system reports the length and slope from the first point to the second. If the user clicks a third time, the system reports the angle made by the last three points clicked. Tools that display information based on what the mouse is pointing at are also useful for word processors; for example a tool could display the definition of a word that is selected through the tool.

2.10 Non-Dominant Hand Pointing

Figure 23:
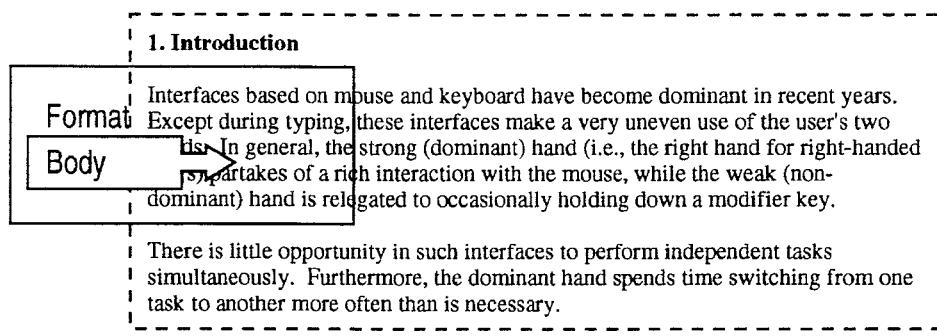

While most of the tools use the non-dominant hand to position the overlay and use the dominant hand for pointing, it also makes sense to use the non-dominant hand for pointing if the objects to be pointed at are large. For example, in a text document, paragraphs are usually large enough to point at with the non-dominant hand. FIG. 23 shows a tool that reveals hidden structure of the paragraph that is under the tip of the arrow, which moves with the overlay. This tool always displays the name of the printing format that will be used to format this paragraph for a printer. In this example, the arrow points to a paragraph whose format is named "body."

2.11 Gesture-Interpreting Tool

Figure 24:
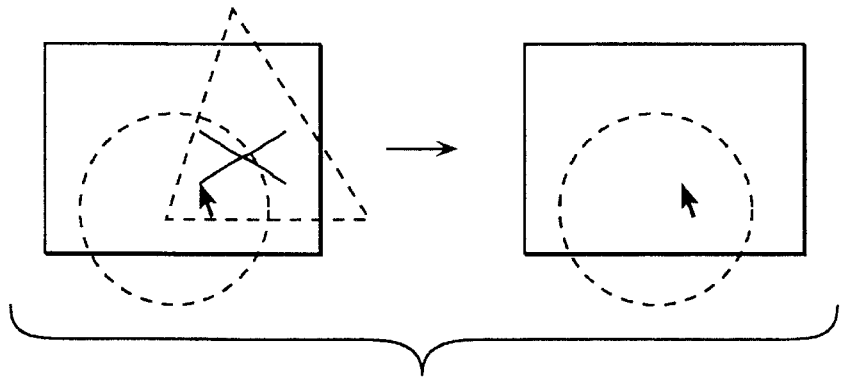

One particularly exciting application of the overlay is to provide the user with complete local input interpreters. For example, a drawing program might normally interpret mouse input as a set of commands, such as select, move, create line and so forth (e.g., see Rubine's work on editing graphics with gestures [*Rubine91] or Goldberg and Goodisman's work on editing text with gestures [*Goldberg91]). By positioning a gesture-interpreting tool over the scene, the user might interact with that same editor in a different way. For example, in FIG. 24, the user draws an 'X' on a gesture-interpreting tool. If 'X' means "delete" to this tool, the object underneath the X would be deleted.

Such a gesture interpreter could be used in a variety of applications. For instance, it provides a way to layer a gesture interface on top of a mouse-based word processor. In a paint program, mouse or pen motions could lay down paint when the gesture-interpreting tool is absent, but perform editing commands when it is present. Furthermore, the interface provided by a gesture-interpreting tool could be common among applications. For instance, if the overlay is provided by the window system, the same gesture interpreter could be moved from a drawing program to a word processor, allowing the user to use a given gesture in multiple contexts. For instance, the 'X' of FIG. 24 could be used to delete shapes in a drawing program, paragraphs in a word processor, or a region in a paint program.

2.12 Combining Local Command Interpreters and Visual Filters

Figure 25:
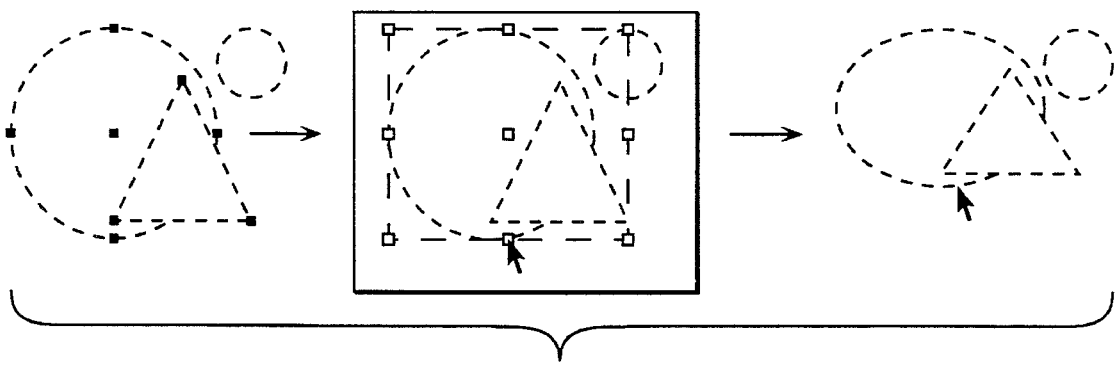

The idea of having a local command interpreter can be combined with visual filters. For example, many drawing programs display small user interface objects, called handles, on top of scene objects. By pointing at these handles with the cursor and depressing the mouse button, users can perform translation, scaling, and stretching operations on objects. This idea can be combined with the overlay to provide a variety of different kinds of handles. For example, in FIG. 25, the user has selected two objects of three in a picture; the selected objects are highlighted with small black squares. By positioning a transformation handles tool, the user can see and point at any of a set of control handles (small white squares). Clicking and dragging on the central handle will translate the selected objects. Clicking and dragging any of the other handles will stretch the selected objects.

The utility of visual filters that add temporary tools, positioned relative to application objects is particularly apparent when several such filters are available on a single overlay sheet. In this case, the user can alternately make use of one set of temporary tools and then another. For example, one set of tools might provide editing handles that allow translation and stretching as described above. Another set might provide rotation about the center of a shape or any of its corners. If all of these tools were provided at once, the temporary tools would result in unacceptable clutter. Presented alternately, however, they make it possible for the user to take advantage of a large variety of tools whose attributes (including position, type, and number) depend on the attributes (including position, type, and number) of application objects and hence are particularly tuned to effectively operate on them.

2.13 Logging and Debugging Tools

Figure 26:
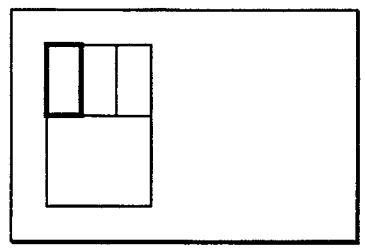

Tools can be used not only for the normal operation of an application, but also to allow a user to get help about that application or to allow a programmer to debug the application. An example is a tool such that stylus gestures or mouse actions performed within the bounds of that tool cause the tool to display information about the command that the user is trying to perform. For example, FIG. 26 shows a tool that displays a picture of the mouse. When the user presses down a mouse button while the cursor is in this tool, the mouse icon displayed on the tool shows which mouse button is being depressed. Such a tool would be useful, for instance, when making videotapes of an interactive tool. A more sophisticated version of this tool would also display the name of the command being performed and offer to open the source code that implements that command.

2.14 Operations That Use An Insertion Point

Figure 27:
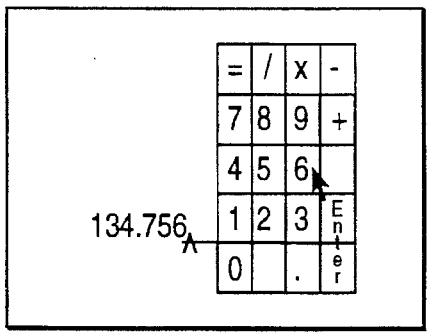

While click-through buttons are a particularly interesting kind of button made possible by the overlay, even regular buttons are useful. For example, FIG. 27 shows an array of buttons that act as a numeric keypad. This keypad can be positioned near the area where a user is working and activated with a pen or cursor, making a keyboard unnecessary for some operations. Each time the mouse clicks on a digit, the overlay moves one character's width to the right. This keypad could also be used as a calculator allowing the user to insert computed numbers into a document easily.

2.15 Rotatable Tools

Figure 28:
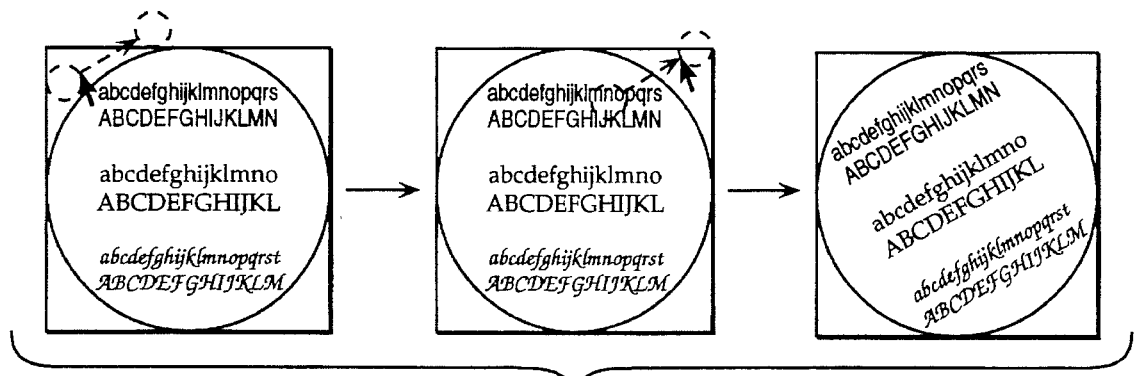

Some tools above, such as the alignment line tools, can translate slightly relative to the overlay sheet. It is also possible to allow tools that can rotate and scale relative to the overlay sheet. For example, FIG. 28 shows a tool for selecting a typeface and/or typing text. To produce text at an arbitrary angle, the user can rotate the tool. In this example, if the user clicks on two scene points through the measuring region (corners) of the tool, the tool orients itself to the slope of the line between the two measured points. When the user subsequently selects a font from this tool, the new text is added at this measured angle in the selected font. While the example shown here stays reoriented until another measurement is made, it is also possible to have the tool reorient temporarily.

2.16 Combining Graphical Search, Guidelines, and Object Creation

Figure 29:
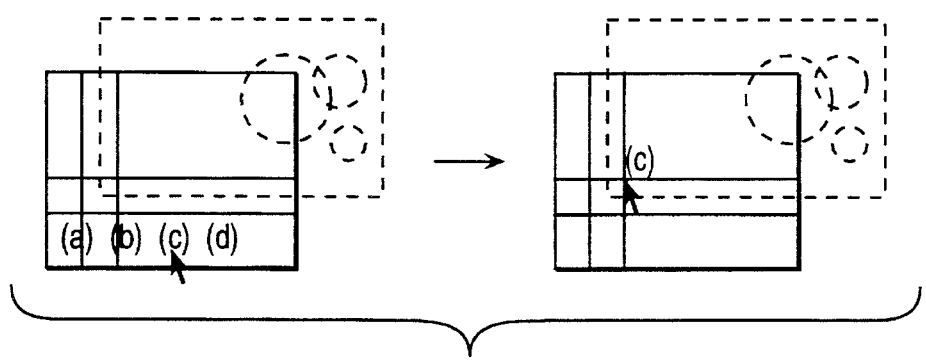

As described above, the overlay tools can combine several task steps into a single two-handed gesture. One extreme example of step reduction is the figure labelling tool shown in FIG. 29. This tool combines constraint-based graphical search [*Kurlander92], snap-dragging alignment lines, visual filters, and a push-through object template. This tool is used to put a figure label at a set position in the bounding rectangle for all illustrations. When this tool is moved over a scene region, constraint-based graphical search is used to find all large rectangles in that region. For each such rectangle, the tool draws alignment lines at a fixed distance from each edge of the rectangle. Using the mouse, the user can select one of the text labels on the surface of the tool, and snap this label to the alignment lines by using snap-dragging.

2.17 Tool for Loading Documents into Windows

Figure 30:
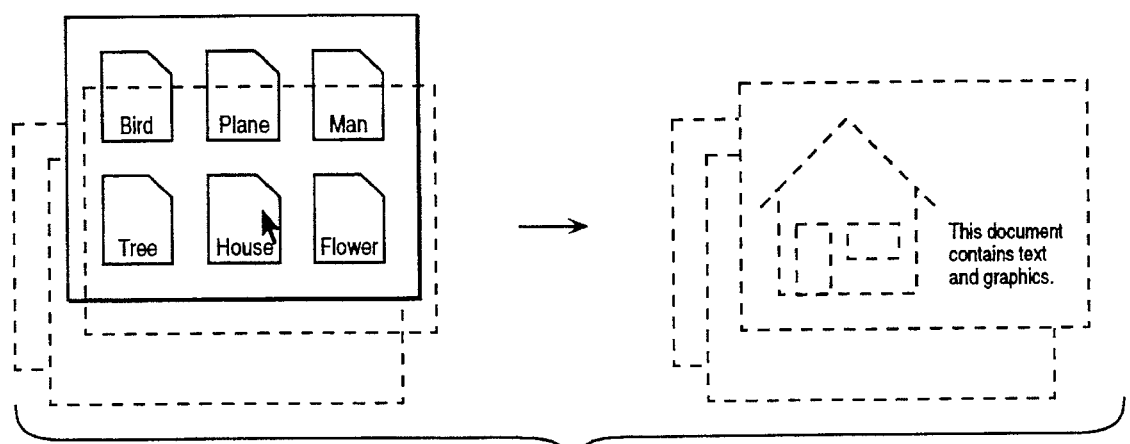

In addition to adding one or a few objects to a picture, overlay tools can be used to load an entire disk file into an editor window, document frame, or other region. FIG. 30 shows such a tool. The first portion of the figure shows the tool, which has a number of document icons, positioned over a set of document windows. When the user clicks on an icon, the corresponding document (which, in the example, contains text and graphics) opens in the window that is behind the cursor. In the illustrated example, the user selects a file, named "house," from a set of available files to be placed in the selected window, whereupon the contents of file "house" are displayed in the selected window. An alternative approach would be to have the user position the tool near the desired window and drag the icon into the window.

3.0 Customizing and Using the Overlay

No matter how well the designer of the system is attuned to the needs of users, there is no such thing as a prototypical user. Accordingly, it is anticipated that the system will allow the user to customize the overlay tools and tool layout to suit personal preferences and to adapt the overlay to a particular task at hand. This section describes a number of possible ways that users can do so. Further, the overlay can be used more effectively if there is a simple and consistent set of conventions for the use of the overlay tools. This section describes a number of ways in which users can make more effective use of the overlay.

3.01 Moving, Copying, and Deleting Tools

Figure 31:
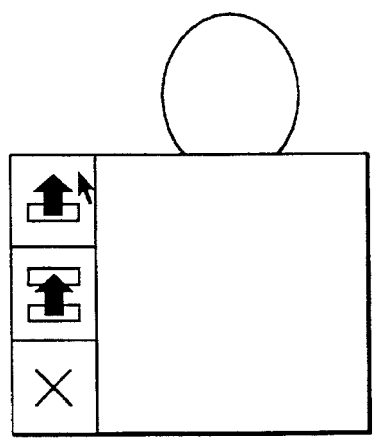

At the minimum, the user is likely to want to create more of one kind of tool and fewer of another, and position tools into clusters that are commonly used together. If the user is to have the capability of participating in organizing the overlay, the user should at least be provided with the capability of moving, copying, and deleting tools from the overlay sheet. FIG. 31 shows one technique for providing this capability, namely providing handles that perform these operations, on the tools. The specific example is the rubbing tool described in connection with FIG. 9. As shown in FIG. 31, the handles are icons to the side of the tool for providing the desired operations. The user is shown as clicking on a handle to move the tool. In practice, the handles on tools should probably be smaller and less detailed than those shown. Alternatively, the handles could be made so that they are invisible (and ineffective) during normal use, and are only subjected to these operations in a tool editing mode.

3.02 Tool Organization

A typical application is likely to have a large number of tools in its interface. To avoid clutter, it is necessary to organize these tools and sheets so that the user can quickly find any desired tool. One approach is to put all of the tools on a single sheet that can be navigated by scrolling and zooming. The tools could be organized onto tiles, and the resulting tiles abutted to form the single large sheet. To find any tool, then, the user would scroll the desired tile onto the screen and scroll the desired tool into place. Using scrolling and zooming functions together, the user would be able to navigate in a rather large space of tiles. In addition, the mapping between trackball motions and the overlay motions could allow for larger motions when the trackball is moved quickly so that little trackball motion is needed.

For very large numbers of tiles, a hierarchical organization could be used in addition to this tiling organization. For example, the user might create a virtual "box" containing a number of sheets of the overlay, each adapted to a particular task. Alternatively, each tile in an array might in fact be a stack of tiles. The user could select which tile is currently visible by repeatedly clicking on a button, or using pop-up menus. The user could also use a single tile (rather than an array) that cycles through a set of tile types.

The technique used in a current prototype allows a single sheet to show different sets of tools at different times. The set to display can be selected in several ways. The user can click a special tool in the set, which causes a jump to another set (somewhat in the manner of the arrows in Apple Computers' HyperCard(TM)). In addition, a master view provides a table of contents of the available sets, thereby allowing the user to jump to any one. To use different sets simultaneously, the user creates additional sheets.

3.03 Composing Tools—Visual Macros

Figure 32:
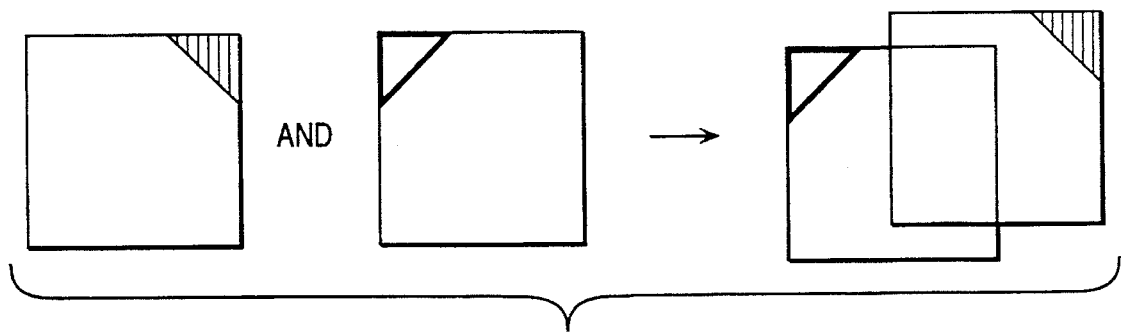

Click-through tools and visual filters can be composed by overlapping them, thereby providing the user with the ability to interactively create new operations by combining old ones. This provides an intuitive and powerful macro capability. FIG. 32 shows, at the user level, how a tool that changes fill colors (say to red) is composed with a tool that changes line colors (say to blue) to form a tool that can change both fill and line colors. In the example, the two tools are brought together so that their active areas are partially overlapping. If the user clicks in a portion of one of the tools that is not overlapping with the other tool, the resultant operation is merely the operation that is normally provided by the single tool. On the other hand, if the user clicks in the overlapping region, the resultant operation is a combination of the operations of both tools.

The composition of tools can be accomplished in two ways. First, the two tools can be overlapped on the same overlay sheet so that they move together as a unit. This is convenient when the combination is likely to be used frequently. It is also possible to compose tools that are on separate overlay sheets so that they can be moved independently, and brought together on the few occasions where the particular combination is needed.

When a stack of overlapped tools (or filters) receives input (e.g., a mouse click), the input event is passed top-to-bottom through the tools. Each tool in turn modifies the command string that has been assembled so far. For example, a tool might concatenate an additional command onto the current command string. Consider the example, discussed above from the user's point of view, of the tool that changes fill colors to red being composed with the tool that changes line colors to blue to form a tool that changes both fill and line colors. If the line color tool is on top, then the command string would be "SetLineColor blue" after passing through this tool, and "SetLineColor blue; SetFillColor red" after both tools.

3.04 More Complicated Macros

The composition of tools described above is a powerful technique for implementing macros. However, if the user wishes to compose more than a few tools, there is a risk that the intuitive visual advantage will be lost in a clutter of tools. In view of this possibility, the overlay provides an alternative technique for creating composite tools. The technique is similar to the macro recording facility found in some programs. This typically would require that the user place the system in a mode for macro creation, then perform a desired sequence of operations on a single object. The system would automatically produce a composite tool of all operations performed on this object.

This composite tool has a number of advantages. For example, if it is desired to apply the set of operations to a number of objects, some of which may not yet have been drawn, the application to additional objects requires a single step rather than reapplication of the entire sequence of individual operations. Additionally, the user can easily apply the set of operations in an exploratory manner, either to single objects or to a set of simultaneously selected objects.

3.05 Remembering Selected Objects

A problem that sometimes arises is that a user selects a set of objects and performs a set of operations on them, either all at once, or individually. At some later time, the user may wish to modify or undo the operations. The overlay can provide such a technique by providing each tool with the ability to remember what objects it has been applied to. The user can then apply an operation to each of a group of objects, realize that another operation is needed, and recover the set of objects, without having to remember the objects or explicitly perform a selection operation. This mechanism is useful even if the tools only remember the most recent set of shapes that were selected.

3.06 Creating and Modifying Tools

Some techniques for creating and modifying tools have already been described. These include the provision for moving, copying, deleting, and overlapping tools to organize the overlay, discussed above, and the techniques for copying object shapes and attributes to create specialized clipboard tools as discussed in section 2.03. The present invention contemplates allowing the user additional flexibility to create and modify overlay tools. For example, it would also be possible to use a drawing program or word processor to produce the geometry of a new overlay tool, and then apply behavior to the geometry using the EmbeddedButtons architecture [*Bier90, Bier91a, Bier92].

Further, it should also be possible to use one sheet of the overlay to edit another. In such an environment, an overlay sheet would become editable in the same manner as a drawing in a graphical editor, and the various tools and techniques described above could be brought to bear. Moreover, if the non-dominant hand can resize a sheet of the overlay as well as reposition it, then the user can make tools larger or smaller for special applications.

Two toolkits for creating overlay tools are currently under development. The first is a traditional toolkit in which tools are created through object-oriented programming. The second toolkit is based on the EmbeddedButtons technology where users draw new tools and collections of tools using a graphical editor and then apply behavior (e.g., click-through button functionality) to these graphical forms, where the behavior is expressed in a user customization language.

3.07 Zooming and Scrolling

There are two equivalent ways for the user to position a sheet of the overlay over an application. The scene can remain fixed while the user moves the overlay over the scene, or the overlay can remain fixed while the user moves the scene under the overlay. It makes sense to provide both of these kinds of functionality to the user. Scrolling the application allows the user to bring off-screen parts of an application to an on-screen tool, making manipulation of large applications possible. Scrolling the overlay over the application allows the user to bring off-screen tools to on-screen application objects, making the use of large sheets of the overlay possible. References to positioning the overlay relative to the visible representation should be taken to include rotation as well as translation.

While it is possible to move an overlay sheet by depressing a mouse button and dragging on the border of the sheet, using the dominant hand, the use of the non-dominant hand and the second input device (e.g., trackball) is preferred. One way of mapping trackball buttons to these functions is as follows. Clicking the left button causes the trackball and thumbwheel to scroll and zoom, respectively, the scene (application). Clicking the right button causes the trackball and thumbwheel to scroll and zoom, respectively, the overlay. Clicking the middle button allows the scene and the overlay to be scrolled and zoomed as a unit. The user could be given the opportunity to customize this mapping. For example, a user who wishes to be able to easily make the overlay disappear when it is not needed and reappear when it is may prefer to have one of the trackball buttons toggle overlay visibility on and off. Furthermore for embodiments where there are multiple overlay sheets, it may be desirable to provide additional mappings to allow the sheets to be scrolled and zoomed independently. This could be done by having the user click different combinations of trackball buttons for the different sheets.

With these moving and sizing controls, the user can center a tool on any application object and size the tool to cover any screen region. Large tools can be used to minimize sheet motion when applying a tool to several objects. A tool that has been stretched to cover the entire work area effectively creates a command mode over the entire application. For several of the tools above, it is necessary to be able to "freeze" the overlay in some sense. For instance, the "snapping" tools of section 2.06 require that alignment lines stay frozen once placed so that scene objects can subsequently be snapped to them. One convention for using the overlay would fix the position of these tools relative to the overlay sheet when the overlay sheet is fixed to the scene (e.g., when the middle trackball button has been clicked).

Another possibility that addresses the same issues as zooming and scrolling the overlay is a tool layout where a set of tools is drawn larger and others smaller, with the set that is drawn larger being under the user's control. This is somewhat akin to a fisheye view of the tools, allowing the user to see many tools and use a few tools, without taking up much screen space.

3.08 Keyboard for Moving Overlay

While the embodiments described above make use of an input device, such as a trackball, that can easily trigger both large and small motions in the overlay as the set of positioning signals, it is also feasible to provide the set of positioning signals from an input device that only reports on-off-transitions, such as a keyboard. For example, a set of keys on a computer keyboard could be designated to move the overlay by some amount in some direction. By striking these keys one or more times, the user can position different delineated regions over a given workpiece. The layout of tools on an overlay could be tuned to work well with this approach. For example, the tools could be laid out in a regular array whole spacing is a multiple of the distance the overlay moves after each click of the overlay-moving keys.

Alternatively, a keyboard key could be used as a "reverse-clutch" that allows the overlay to be easily coupled and de-coupled from the motion of the mouse. When this key is held down, the overlay moves with the mouse cursor. When it is released, the overlay stays where it has been placed and the mouse cursor moves independently.

The use of the keyboard in connection with scrolling the overlay has the advantage of providing relatively easy use of the overlay for those users whose computers are not configured with a trackball and a mouse.

3.09 Modal Tools

While two-handed users can repeatedly perform an operation on a variety of objects by moving both the mouse cursor and the tool around on the screen, this requires a lot of coordination and is likely to be inconvenient for one-handed users who must sequentially reposition the overlay and then the mouse cursor. It is possible to overcome this problem by allowing a smooth transition between the overlay metaphor and more traditional moded interfaces. For example, the tool handles described in section 3.01 could include a button for placing the cursor in a tool mode corresponding to that tool. While in this mode, users can repeatedly perform operations as though they were clicking through that tool. The cursor could take a shape similar to that of the tool as a reminder of the persistence of the mode. This is somewhat akin to a user selecting a conventional modal tool.

Allowing a click-through tool to become a temporary modal tool raises the issue of whether the temporary modal tool can be allowed to cooperate with other tools. One approach is to allow the temporary modal tool to be composed with other tools in the same way that a click-through tool can be composed. The alternative approach is to require that a temporary modal tool be the only tool that can operate on the underlying data. That is, putting a tool in the mode would preclude the use of the other tools. In such a case, the overlay sheet could be replaced, during the mode, by a button that allowed the user to exit the mode. Getting in and out of such modes could also be done using a gesture. For example, double-clicking in a tool might enter a mode. Double-clicking again would exit.

3.10 Dragging Out of a Tool

The typical use of a tool will include moving the mouse cursor into the tool, pressing one of the mouse buttons, and, with possible intervening operations, releasing the mouse button. There are a number of possibilities between the depression and release of the mouse button. These include the possibilities that the mouse doesn't move at all, that the mouse moves and remains in the tool, that the mouse leaves the tool, and that the mouse leaves the tool and returns. One possible convention is that if an operation begins in a tool, that operation should persist until the mouse button is released. This convention would allow tools to be relatively small, while allowing users to begin an operation in the tool and then continue it outside.

3.11 Combining Click-Through Tools and the Overlay with Conventional Tools

As mentioned above, conventional tools can be used in conjunction with overlay tools or can be used as overlay tools themselves. A possible scenario is where the overlay with click-through tools is provided as an upgrade to an existing program. Users familiar with an earlier version of the program, which used a conventional user interface, might wish to proceed cautiously in the face of a powerful new user interface. Thus the user might decide to keep most of the conventional tools as a series of palettes that are movable with the mouse cursor, but add a few of these tools to the overlay. As the user became more familiar with the use of the overlay and the use of the non-dominant hand for positioning tools quickly and conveniently, the user could add more tools to the overlay. The user might first create one or more overlay sheets with conventional tools only, start experimenting with a few click-through tools, and later mix the click-through tools with conventional tools on the same sheet.

It is also possible to compose click-through tools with conventional tools. For example, a click-through color palette such as shown in FIG. 7 could be combined with a set of conventional modal shape creation tools of the type where the user clicks on a tool and then moves the cursor to the drawing area and clicks or drags with the cursor to form the shape. Such a combination would allow the user to select the color and shape in one step by superimposing the click-through button for the desired color over the desired conventional shape tool. The user would still have to move the cursor and form the shape in the conventional way. While this doesn't provide the total economy of motions that characterize the tool shown in FIG. 14, the user still benefits by being able to select color and shape with a single click. The modal tool could also be used with click-through buttons that specify other object properties such as line weight, dash style, and the like, and with compositions of click-through buttons for specifying more than one object property.

Another example of such composition is where the user first clicks on the conventional shape tool, and then proceeds to draw shapes through one or more click-through buttons for the desired set of properties. In this way, the user is able to select the properties and position of the object to be drawn in one step, having pre-selected the shape of the object by clicking on the conventional shape tool.

4.0 Specific Implementation

This section describes a current implementation of the see-through interface that includes the overlay tools and visual filters. The software is currently implemented in the Multi-Device Multi-User Multi-Editor (MMM) framework [*Bier91b] in the Cedar programming language and environment [*Swinehart86] running on the SunOS UNIX(TM)-compatible operating system on Sun Microsystems SPARC-stations and other computers. The Gargoyle graphics editor [*Pier88], as integrated into MMM, serves as a complex application for testing the interface. User input devices include a standard mouse for the dominant hand and a MicroSpeed FastTRAP(TM) trackball for the non-dominant hand. The trackball includes three buttons and a thumbwheel, which can be used to supply additional parameters to the interface.

This section describes three overlay subsystems: one that handles simultaneous input from two pointing devices and updates the screen after multiple simultaneous changes, one that modifies pointing events as they pass through tools and visual filters, and one that modifies graphical output as it passes up through each tool or visual filter.

4.01 Multi-Device Input

The see-through interface relies on the following features of MMM. MMM takes events from multiple input devices, such as the mouse and trackball, keeps track of which device produced which event, and places all events on a single queue. It dequeues each event in order and determines to which application that event should be delivered. MMM applications are arranged in a hierarchy that indicates how they are nested on the screen. Each event is passed to the root application, which may pass the event on to one of its child applications, which may in turn pass the event on down the tree. Mouse events are generally delivered to the most deeply nested application whose screen region contains the mouse coordinates. However, when the user is dragging or resizing an object in a particular application, all mouse coordinates go to that application until the dragging or resizing is completed. Keyboard events go to the currently selected application. To support the overlay, MMM's rules for handling trackball input were modified. When the overlay is movable, trackball and thumbwheel events go to the top-level application, which interprets them as commands to move or resize the sheet, respectively. When the sheet is not movable, the trackball and thumbwheel events are delivered to the selected application, which interprets them as commands to scroll or zoom that application.

Figure 33:
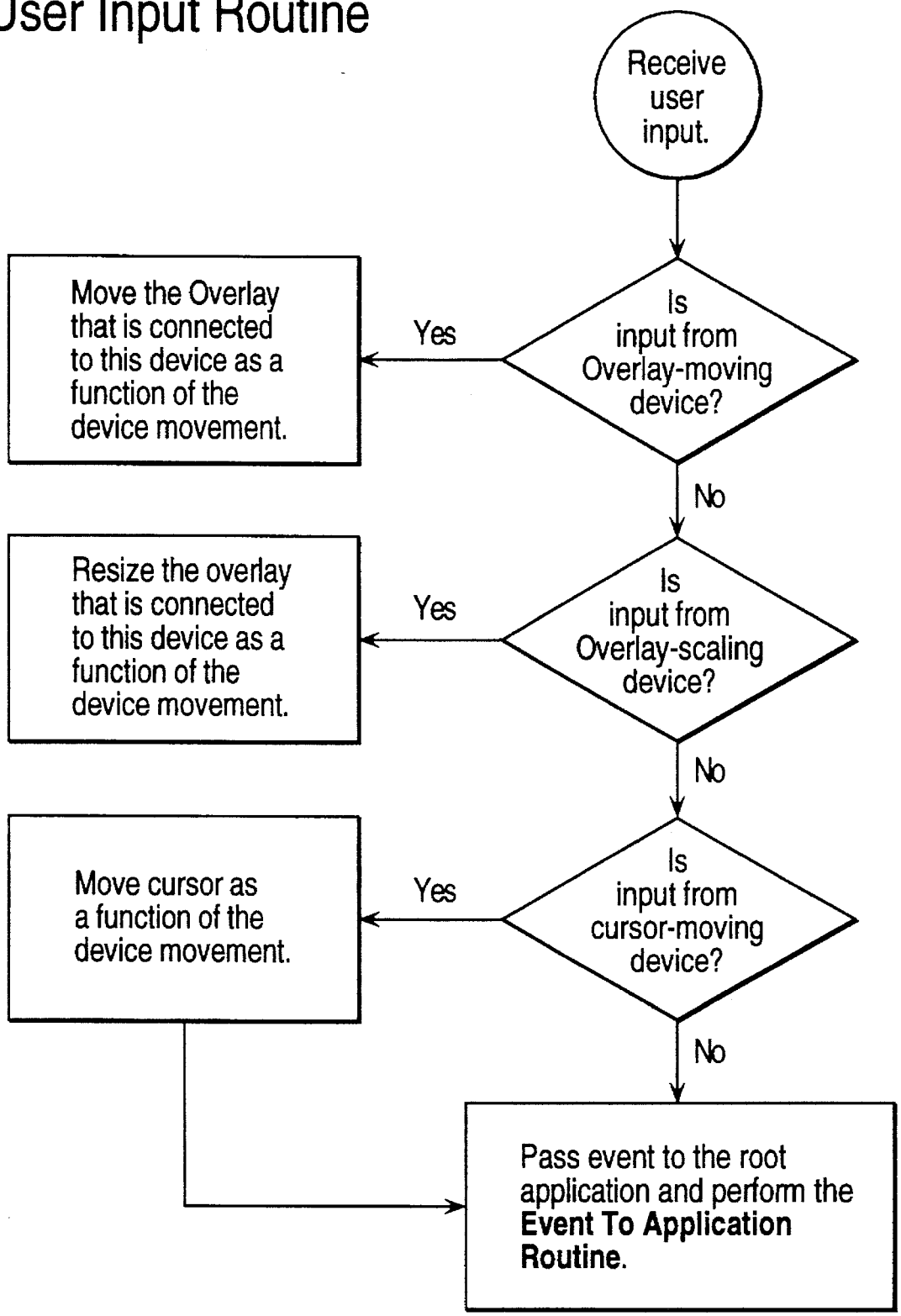
FIG. 33 is a flowchart of the user input routine for a particular implementation.

FIG. 33 is a flowchart of the User Input Routine, which determines the appropriate action to take in response to an input event. When a system that contains an overlay receives input, it must determine whether the event is intended to move the overlay, move the cursor, trigger the overlay, or to be delivered to a traditional application in the usual way, and then it must act on this determination. The routine first tests whether the input is from an overlay-moving device, and if it is, moves the overlay as a function of the device movement. If not, it tests whether the input is from an overlay-scaling device, and if it is, it resizes the overlay as a function of the device movement. If not, it then tests whether the input is from a cursor-moving device, and if it is, it moves the cursor as a function of the device movement. Next, if appropriate, the event is passed to the root application (which may be, for instance, a window manager), which determines where the event will be delivered next.

Note that the phrase "overlay-moving device" refers to a device that is currently designated as being for moving the overlay. A particular physical device is an Overlay-moving device at a particular time, if a software data structure, called the "device table" currently designates that device as an overlay-moving device. This designation can be changed by the user at any time. The same is true for the phrase "overlay-scaling device."

4.02 Filtering Input Through Tools and Visual Filters

Figure 34A:
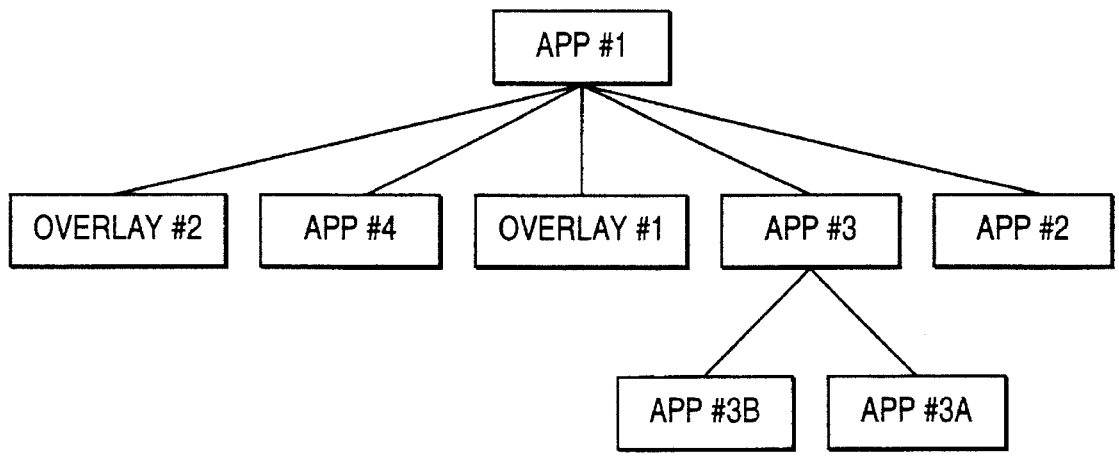
FIGS. 34A–34C show a hierarchy of applications, a screen representation thereof, and the event delivery order therefor.
Figure 34B:
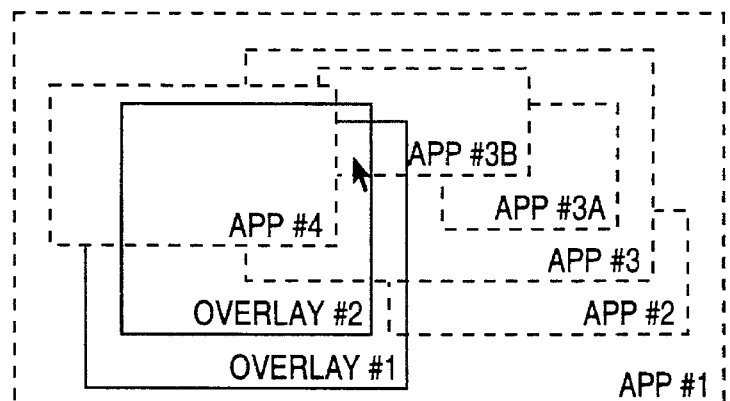

Ordinarily, MMM input events move strictly from the root application towards the leaf applications. However, a system implementing the present invention may contain a number of overlay sheets interspersed with the applications. In order to support the overlay, input events must be passed back up this tree. For example, FIG. 34A shows an application hierarchy among applications denoted #1, #2, #3, #3A, #3B, and #4, and overlay sheets denoted #1 and #2. FIG. 34B shows how the application windows and overlay sheets might appear on the display, given the hierarchy.

Application #1 is the root application and its window contains all the other relevant application windows. In the present implementation, this would be the top level MMM rectangle editor, which acts as a window system. The left-to-right order at each of the two lower levels of this tree indicates the top-to-bottom order of applications on the screen, with application #4 being the topmost application. Overlay sheet #1 is located between applications #3 and #4, while sheet #2 is located above application #4. Applications #3A and #3B are shown as being contained in the window of application #3, but they might be otherwise associated with it.

Input events are first delivered to the overlay to determine if the user is interacting with a tool or visual filter. If so, the event is modified by the overlay. In any case, the event is returned to the root application, which either accepts the event itself or passes it on to the child applications that appear farther to the right in the tree. Consider the example where the cursor is positioned as shown in FIG. 34B, namely within the active area of each of the overlay sheets and over application #3B. If the user gave a triggering event, such as pressing a mouse button, the event would pass first through sheet #2, then through sheet #1, and then to the application that contains the cursor coordinates, namely application #3B.

The data structure that represents an MMM event is modified in three ways to support the overlay. First, an event is annotated with a representation (event fields referred to as "belowChild" and "belowTool") of the parts of the application tree it has already visited. This prevents the root application from delivering the event to the sheet more than once. Second, an event is tagged with a command string to be interpreted when it reaches its final application. For example, a color palette click-through button annotates each mouse-click event with the command name SetFillColor followed by a color. Finally, if the tool contains a visual filter, the mouse coordinates of an event may be modified so the event will be correctly directed to the object that appears under the cursor through that visual filter.

Figure 34C:
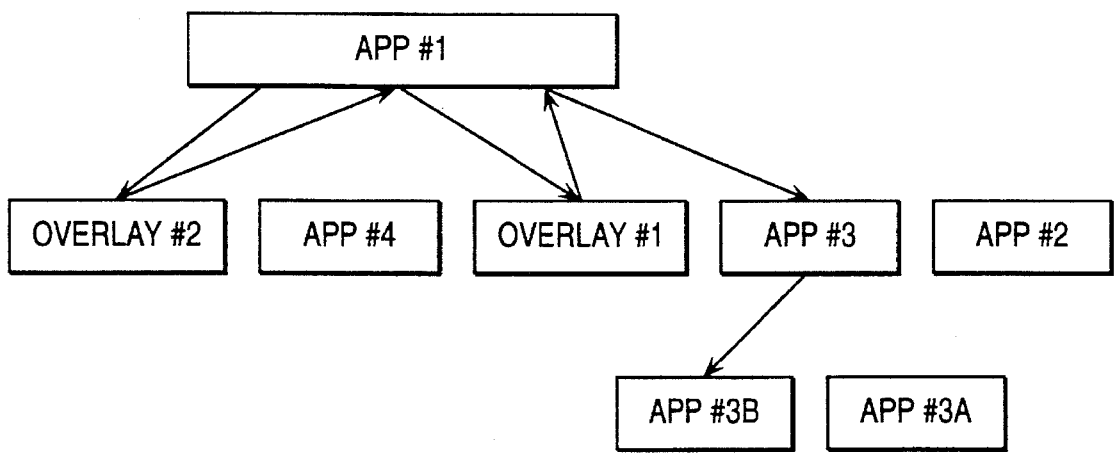

FIG. 34C shows how the event described above is delivered to the correct application. In particular, in order that the event be delivered to the sheets and application layers in the correct order and with the correct device coordinates, the event travels both up and down the hierarchy of applications.

4.03 Event Delivery Routines

Section 4.02 above describes the way that input events are routed through possible overlay sheets to the intended application. This and the following sections describe the event handling in additional detail with reference to flowcharts and pseudocode for certain of the important routines, namely the User Input Routine, the Event to Application Routine, the Event to Overlay Routine, the Event to Tool Routine, the Translate and Execute Routine, and the Composition Routine.

The delivery of events through overlays to applications, as described above and shown in FIGS. 34A–34C, uses three routines: the Event to Application Routine, which is performed when an event is delivered to a regular application, the Event to Overlay Routine, which is used when the event is delivered to an overlay, and the Event To Tool Routine, which is used when an event is delivered to a particular tool on an overlay. Each of the these routines may call one or more of the other ones (e.g., when an event is passed from a regular application to an overlay or from an overlay to a regular application, as occurs several times in the example described above).

A given event E has a field "belowChild" that contains an array (or other multi-valued data structure), with one entry for each application and sheet in the tree. The value of each entry, belowChild[A], is a pointer to the application or sheet that is a child of A and is the last child of A that the event has visited. A similar field "belowTool" has for each entry, belowTool[O], a pointer to a tool of O that is last tool that the event visited.

Figure 35:
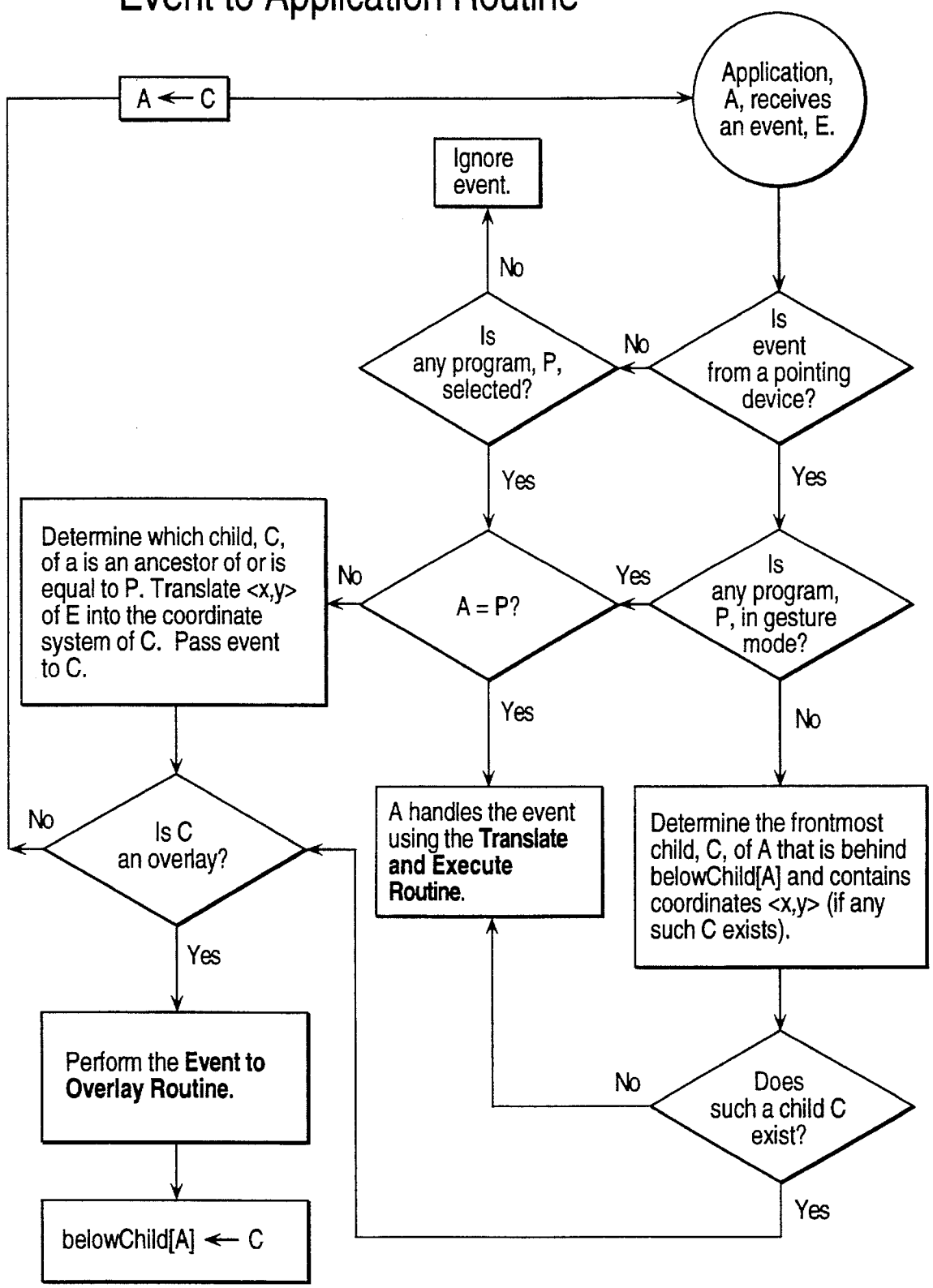
FIG. 35 is a flowchart of the Event to Application routine for the particular implementation.

FIG. 35 is a flowchart of the Event to Application Routine. This routine assumes that some variables are initialized each time a new event is generated. For example, belowChild[O] is initialized to an imaginary application program that is defined to be both a child of application A and in front of all other children of A.

Figure 36:
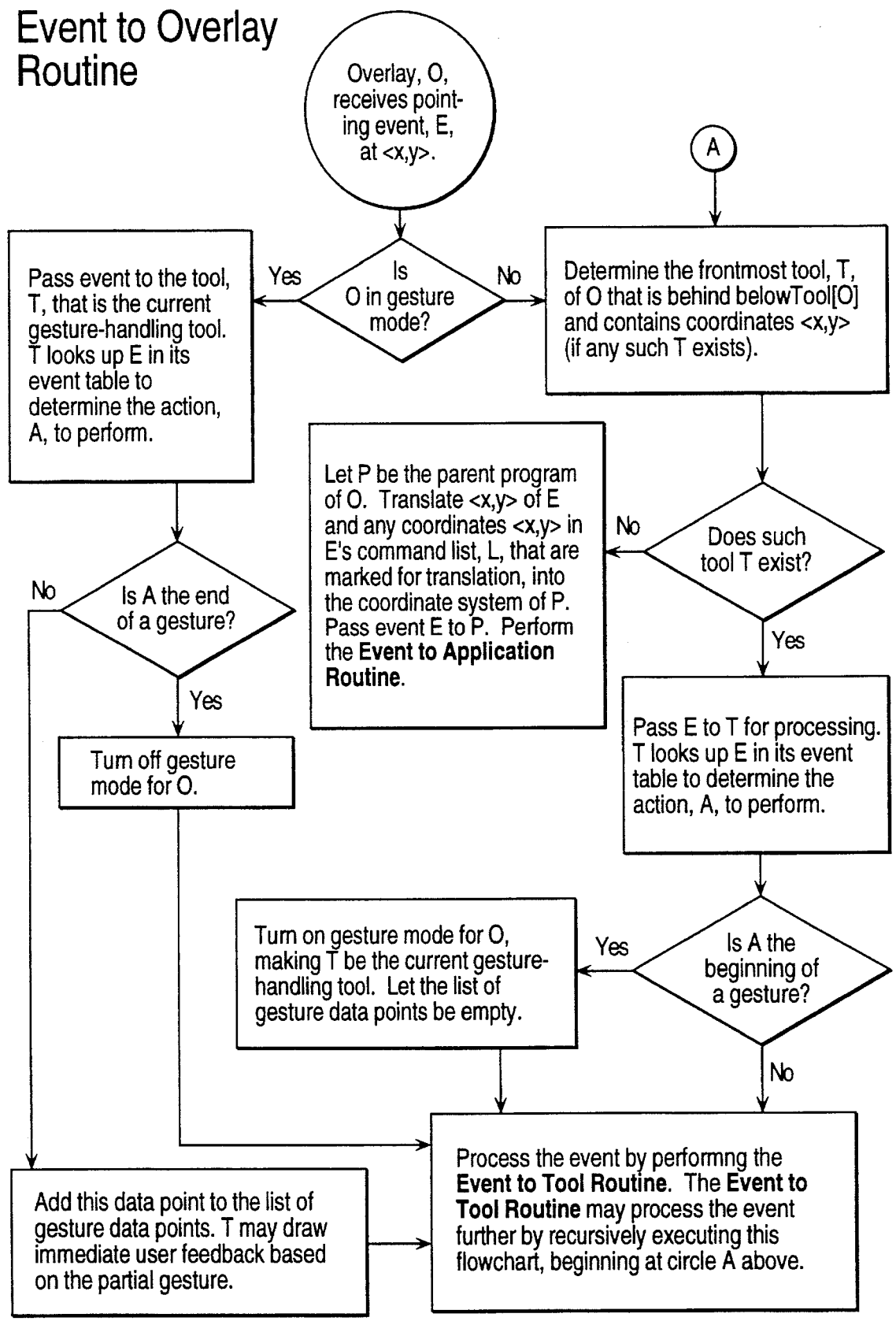
FIG. 36 is a flowchart of the Event to Overlay routine for the particular implementation.

FIG. 36 is a flowchart of the Event To Overlay Routine. When an input event is received by the overlay, the overlay determines which of its delineated regions, called tools, should process the event. In some cases, several tools will process the event in turn. If a tool is a "click-through" tool it computes a data structure called a "command list," which is passed down to the tools behind it (if any) or to the applications that are behind the entire overlay (via the overlay's parent program). This routine assumes that some variables are initialized each time a new event is generated. For example, belowTool[O] is initialized to an imaginary tool that is defined to be in front of all other tools. When an overlay is first created, it is not in gesture mode and none of its tools is designated as the "gesture-handling" tool.

Figure 37:
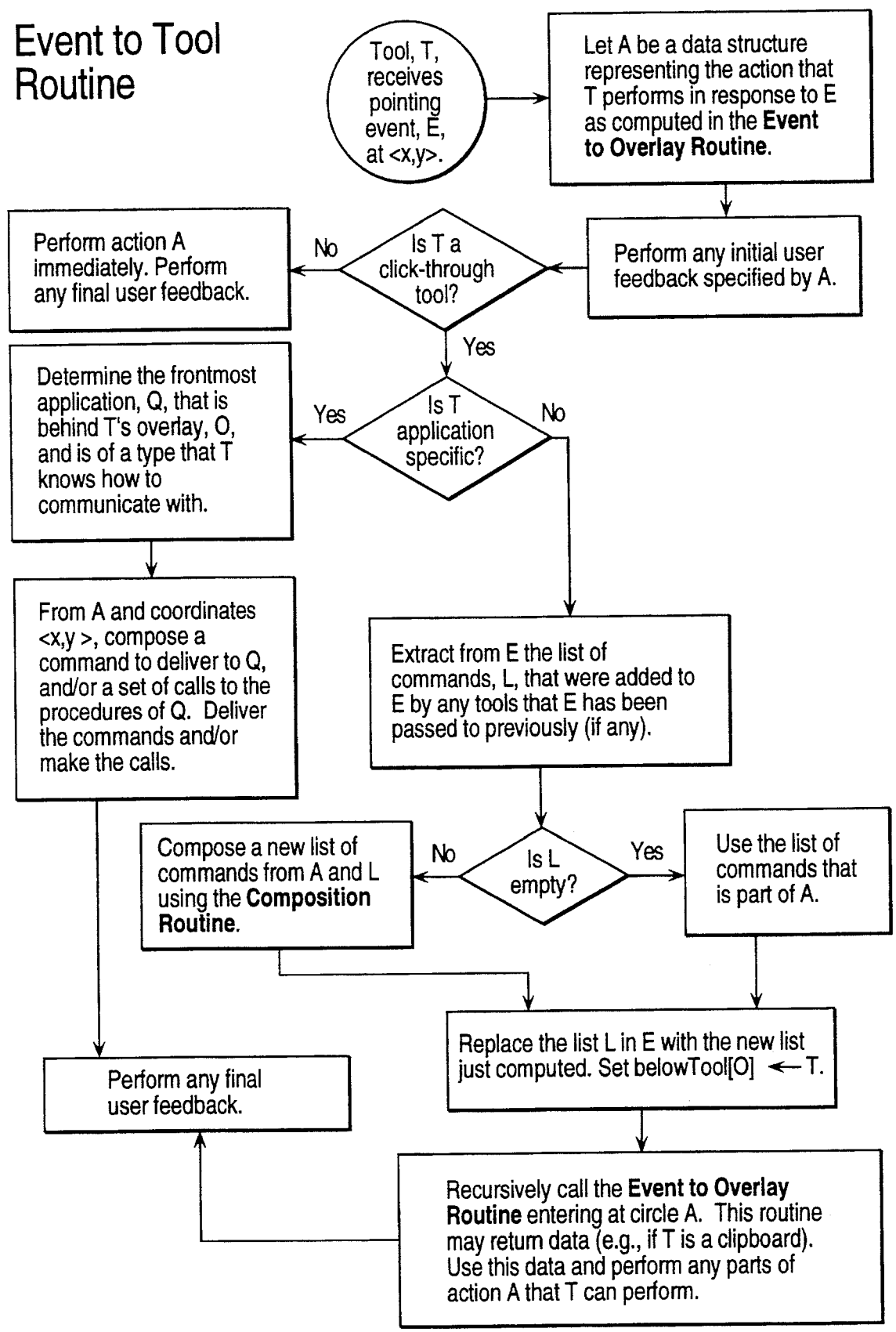
FIG. 37 is a flowchart of the Event to Tool routine for the particular implementation.

FIG. 37 is a flowchart of the Event To Tool Routine. When an event, E, is received by a particular overlay tool, T, T determines from the type of E, what action, A, is to be performed. If T is a conventional (non-click-through) tool, it performs the action immediately. Otherwise, it delivers the event to an application behind its overlay, either directly or via other tools on this or another overlay. If E has already been processed by another tool, T may need to compose A with any other actions already associated with event E.

4.04 Translate and Execute Routine Overview

A given action A may in general be an arbitrary body of code written in a suitable-programming language. This language could be any general programming language such as C or Pascal, but will better support user customization of overlay tools if it is a simple interpreted language, such as Apple's HyperTalk, John Ousterhout's Tcl [*Ousterhout90], or a small version of LISP such as that used in Interleaf [*English90] or in the EmbeddedButtons architecture [*Bier90, Bier91a, Bier92]. To support the use of overlay tools in an environment, such as UNIX, in which each application runs in its own heavyweight process, A can be represented as an interprocess message, such as those provided by the X window system. The current implementation of overlay tools is in the Cedar programming environment [*Swinehart86], using a small LISP-like language to represent actions, and in the UNIX/X Windows using X window messages to represent actions.

When a given software program, P, receives an action A, it must interpret that action in its own context. If A describes an action that could be performed by several programs, P must translate A into its own terms and then perform A on its own (P's) data structures. Interpreting a body of code in a particular context (also called a scope) is a well-known computer science technique. For A to be interpreted successfully, a particular program P must provide bindings (values) for all of the variables used in A. The following examples illustrate the current implementation's particular use of this technique as it applies to the use of application-independent tools.

4.05 Actions Using a General Program

For example, an action A whose intent is to scale up any rectangle that is behind the mouse cursor by a factor of 2 might contain code like this pseudo-code:

FOREACHSHAPE, s, in PICTURE do if ISRECTANGLE[s] and INCLUDES[s, cursorPoint] then SCALE[s, 2.0]
endloop In order to interpret this action, P must provide its own definitions for each of the words shown in upper case. It must provide its own procedure, FOREACHSHAPE, that iterates through the shapes in its picture, its own value for the variable PICTURE, its own routine ISRECTANGLE that tests if a shape is a rectangle, its own procedure INCLUDES that checks if a shape contains a point, and its own procedure SCALE that resizes shapes. In addition, it must make sure that the variable 'cursorPoint' contains the current cursor position as passed to it by the overlay routines described above.

In order to simplify the interpretation of overlay actions, the current implementation of overlays in Cedar does not support general programs, like the one shown in the above example, which includes iteration, conditionals, and computed expressions. Instead, the current implementation restricts actions to a list of commands, where each command is a command-name, followed by a set of values. These values are computed by the overlay, not by the applications.

4.06 Actions with One or More Commands

For example, a single command specifying that P should select the frontmost object that is near the cursor point <23, 37> as long as it is no farther than a quarter of an inch from the cursor might be:

(SelectObject <23, 37>0.25)

As in the language LISP, an entire command is surrounded in parentheses to make it easy to tell where commands begin and end.

Actions may contain several commands as in the following action that selects an object, sets its interior to be red and its outline to be blue:

((SelectObject <23, 37>0.25)(SetFillColor red)

(SetLineColor blue))

where an additional pair of parentheses delineates the beginning and ending of the entire action. This is an example of the command-list referred to as L in the flowcharts above.

4.07 Translation of Commands

This representation of actions is particularly easy to translate in the current prototype, because all of the software programs on which overlays are being implemented already interpret commands that are expressed in this form. Thus, to translate the above program-independent command list into a command list that can be interpreted by a particular program P, it is necessary to translate each generic command into one or more commands that P understands.

For example, P may not have a command named "SelectObject" but may have a command named "Select" with the required functionality. Perhaps Select expects its second argument to be in pixels instead of inches (at 72 pixels per inch, 0.25 inches=18 pixels). Similarly, P may not have a command "SetFillColor" but may have a command "SetAreaColor". If P does have a command SetLineColor, then one correct translation of the command list is:

((Select <23, 37>18)(SetAreaColor red)

(SetLineColor blue))

The length of the command string is not always preserved. For example, the action might contain a command: (SetFillColorAtPoint cursorPoint red), which changes the color of the object nearest the cursor to red. A particular program P might not provide this operation as a single command. In this case, the single command (SetFillColorAtPoint cursorPoint red) might be translated into two commands: (Select cursorPoint)(SetAreaColor red).

If P does not already implement an interpreter for such command lists but does provide a set of procedures that provide the required functionality, actions can be translated directly into procedure calls. For example, the action might be translated into three procedure calls in the Cedar programming language as:

SelectShape[picture, [23, 37], 18];
shape ← GetSelectedShape[picture];
SetAreaColor[shape, red];
SetLineColor[shape, blue];

4.08 Reverse Data Flow

The actions described so far communicate commands and data from the tool to an application program. It is also possible for a command to return data from the application program to the tool. This is accomplished by including some empty storage in the command list. For example, a copy and paste tool might issue the action:

((Select <23,37>18)(GetSelected fillInValue))

Here, "fillInValue" is a pointer to a record, labelled fv, for "future value."

Figure 38A:
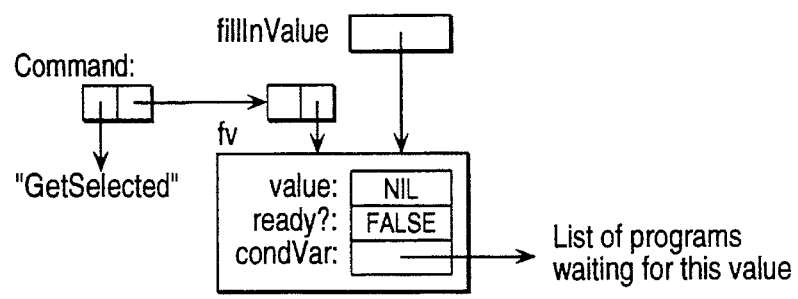
FIGS. 38A and 38B show a command that includes a request for data.
Figure 38B:
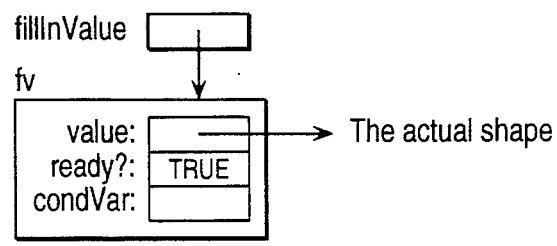

FIGS. 38A and 38B show this record before and after the application has returned the data requested by the command. This record includes a field "value" in which a pointer to the data returned by the application will be placed. A second field, "ready?" has the value false until the field "value" has been filled. The last field "condVar" contains a synchronization object provided by the Cedar programming language, called a condition variable. A condition variable includes a list of those programs that are waiting for this value. When the value becomes available, the application that provides the value notifies each of the programs that are waiting.

In this example, application P will select the shape at coordinates <23,37> and then stores a pointer to it in the field "value." If P is running in a different process than T, T must wait (block) until P has stored the pointer. Because T maintains its pointer to fv, it can reach the "value" field of "fv" once it is notified that the value is now ready.

4.09 Composition Routine

When two or more overlays are overlapped (as are overlays #1 and #2 in FIG. 34B), each event E is finally delivered to the receiving application (application #3B in FIG. 34C) after having been processed by all the overlays in front to back order (overlay #2 and then overlay #1). As a result, the action A may describe an operation that includes contributions from some or all the overlays. Such an action is said to be a composition of the actions that would be determined by each overlay individually.

In the current implementation, each overlay, O, is responsible for combining its action with the action that the event has accumulated at the time that O receives the event. The new action can be computed from the existing action by one of a variety of methods, including appending, prepending, deletion, command alteration, argument alteration, or coordinate alteration. Each of these methods is described below.

4.09.01 Appending

A tool that appends its action simply adds the action's command list to the end of the existing command list to create a compound action. For example, say an overlay O receives an event E whose coordinates <x,y> are contained by tool T of O, and say that tool T is a tool that changes outline colors. Individually, T's reaction to event E would be to generate the action:

((SelectShape <x,y>)(SetLineColor blue))

Say, however, that E has already passed through a tool that has specified an action to set a fill color to red:

((SelectShape <x,y>)(SetFillColor red))

If T is an appending tool, it will append its command list to the existing command list to form the longer action:

((SelectShape <x,y>)(SetFillColor red)
(SelectShape <x,y>)(SetLineColor blue))

4.09.02 Prepending

Prepending is like appending except that the new command list is added to the beginning of the existing list. If ordering of commands matters, prepending may produce a different result than appending. For example, if event E arrives with an existing command:

(RotateShape 45)

that rotates a shape by 45 degrees and if tool T would ordinarily generate the command (ScaleShape 2 1)

which scales a shape by 2 in the x direction and 1 in the y direction, then the final command would be ((ScaleShape 2 1)(RotateShape 45))

which has a different effect than ((RotateShape 45)(ScaleShape 2 1)).

4.09.03 Deletion

The tool T could remove one or more commands from the event. For example, T could protect the picture underneath it from being edited by deleting any commands that could edit that scene. If T received the event:

((SelectShape <x,y>)(SetLineColor blue))

it might remove the (SetLineColor blue) command, which would have modified the underlying picture, but might leave the (SelectShape <x,y>) command which will only change the currently selected object in that picture. The resulting command would be:

(SelectShape <x,y>)

4.09.04 Command Alteration

A tool T could change the command names used in some or all of the received actions. For example, T could change all calls to SetFillColor to call SetFancyFillColor and all calls to SetLineColor to SetFancyLineColor, allowing a user to try out the new fancy commands while still using familiar overlay tools on the overlays in front of overlay O. If such a tool T received the command ((SelectShape <x,y>)(SetFillColor red)
(SelectShape <x,y>)(SetLineColor blue))

it would produce the command:

((SelectShape <x,y>)(SetFancyFillColor red)
(SelectShape <x,y>)(SetFancyLineColor blue))

4.09.05 Argument Alteration

In the case of argument alteration, T modifies the values specified after the command name of a command. For example, T might modify any colors received by previous tools to make them more vivid. If such a tool received the command (SetLineColor blue), it would produce the command:

(SetLineColor vivid-blue)

4.09.06 Coordinate Alteration

Coordinate alteration is a special case of argument alteration. In this case, tool T modifies the coordinates <x,y> specified in a command. This is particularly useful if T contains a visual filter that modifies the view of the picture behind O. For example, if T magnifies the picture underneath, then coordinates from tools in front of T should have a shrinking transformation applied so that commands from such tools will be applied to the object that actually appears through T. Thus, if T scales up the picture behind it by a factor of 2, it should scale coordinates by a factor of 0.5. If the command received is:

(SelectShape <x,y>)

T will produce:

SelectShape (0.5*<x,y>).

4.09.07 About Marked Coordinates

The Event to Overlay Routine identifies those coordinates <x,y> in the command list that are "marked for translation." In general, cursor coordinates will be so marked. This marking will be preserved by the composition routines above, so that when the input commands contain marked coordinates, the corresponding coordinates in the commands produced by composition will also be marked.

4.10 Basic Output Handling

In addition to delivering input events to the application programs behind them, overlays also modify the display of these application programs. In particular, most tools display a visible icon to indicate the boundaries of the active region of that tool. In addition, tools may contain visual filters that filter the view of the application, modifying shapes, colors, sizes and other graphical properties. While the basic operation of visual filters is described in the above-referenced copending application of Stone et al., the sections below describe how the overlay mechanism controls the activation of the visual filters.

Ordinarily, MMM output is composed from the leaf applications up. To support visual filters, the normal screen refresh composition has been extended to allow information to flow down and across the tree as well as up. For example, if the tools in FIG. 34B contain one or more visual filters, and if any of those visual filters is situated over the graphical editor, each visual filter must examine the contents of the graphical editor (which is the visual filter's sibling in the hierarchy) in order to draw itself.

4.10.01 Computing the Region of Change

Figure 39:
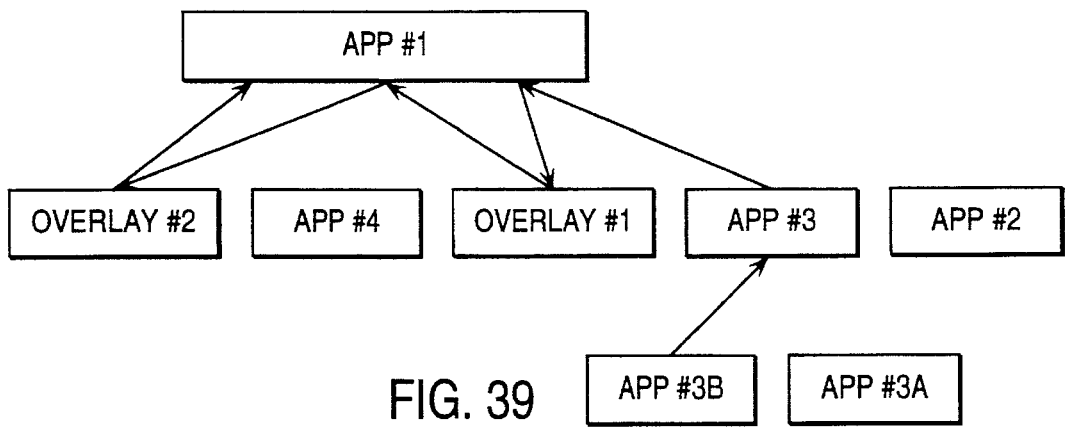
FIG. 39 shows the event delivery order for a screen redraw.

Some parts of the screen refresh routine provided by •overlays are similar to the routine for handling input, but with data passed in the reverse direction. As was shown in FIG. 34C, the overlay routines ensure that input events pass through overlays in front to back order before being delivered to the destination application. To compute what part of the screen must be redrawn when the contents application #3B are modified, the information about the modified part of application #3B is passed along the path shown in FIG. 39, which is the reverse of the path of FIG. 34C.

As the region-of-change information is passed from node to node in this tree, the region of change is translated into the coordinate system of each receiving node so as to be easily understood by that node. In addition, each overlay node may potentially modify the region of change based on current viewing filters that are visible on that overlay. For example, if a given overlay O includes a tool T that contains a magnifying filter, O may increase the size of the screen region that will be affected by the original change to application #3B. O increases the size of the region of change data structure appropriately and passes the modified data structure to the next node in the chain.

4.10.02 Screen Update

In the absence of visual filters, producing a new screen image representing both application and overlays is accomplished by producing a drawing of each node in the hierarchy in depth-first back-to-front pre-order and post-order traversal (i.e., each application is drawn both before and after its children are drawn). For the example of FIG. 39, the nodes would be drawn in the order: Start(application #1) StartAndFinish(application #2) Start(application #3) StartAndFinish(application #3A) StartAndFinish(application #3B) Finish(application #3) StartAndFinish(overlay #1) StartAndFinish(application #4) StartAndFinish(overlay #2) Finish(application #1).

Figure 40:
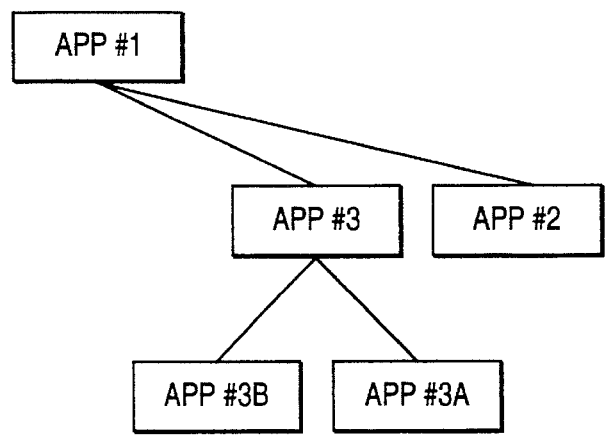
FIG. 40 shows the portion of the hierarchy for the redraw.

However, if an overlay contains one or more visual filters, each such visual filter may require that part of the hierarchy be redrawn using the transformation that characterizes that visual filter. The part of the hierarchy that is redrawn includes the parent of the overlay and all of the siblings of the overlay that are behind the overlay. For example, if overlay #1 includes a visual filter, nodes for application #2, application #3A, application #3B, application #3, and application #1 will be redrawn (in that order). This tree fragment is shown in FIG. 40.

5.0 Advantages

This section summarizes a number of advantages of various embodiments of the overlay. Although some of these advantages were explicitly stated in connection with the above description of various tools, it is useful to set forth these advantages in one place.

5.01 Faster Completion of Tasks

By combining several steps into a single step, overlay tools can save time. As described above, click-through buttons combine command choice and operand selection into a single gesture. With the addition of a visual filter, these buttons also create customized views in the region of the operand, without requiring any keystrokes to explicitly turn such views on and off. In addition, both the user's gaze and the cursor can remain in the work area. This keeps the user focused on the task, and saves time compared to systems that require the user to move the cursor back and forth between the work area and palettes that are placed off to the side.

5.02 Fewer Temporal Modes

With the overlay, an operation is available whenever the cursor is over a tool that provides that operation. Essentially, the overlay provides spatial command modes. Spatial modes are often more desirable than temporal modes because the user can easily see what the current mode is (e.g. by the label on the tool) and how to get out of it (e.g., move the cursor out of the tool).

5.03 Better Graphical Feedback, Fewer Errors

Often systems with temporal modes provide feedback to the user that helps in the successful completion of the current command. For example, in text editing mode in a graphical editor, the editor can highlight all of the editable text strings. Overlay tools can provide this same type of feedback, but within the boundaries of the tool. In fact, with several tools on screen at once, several different kinds of feedback can be provided, each in its own tool. In addition, by zooming a tool to the full size of the editor, the user can achieve the same feedback available with temporal modes. When several tools are visible at once, the feedback in each one serves a dual role. It helps the user make proper use of the tool and it helps the user choose the correct tool.

In addition, the use of visual filters in tools provides a kind of feedback that is not traditionally provided; they show a portion of the scene with a modified view while showing a standard view of the rest of the scene as context. A visual filter can show hidden information, like a hidden vertex. In addition, it can help identify those objects that are appropriate operands for a given operation. For instance, a tool that changes the border colors of objects might show only shape borders. Such feedback would make it hard for the user to mistakenly try to use such a tool for a different purpose, such as changing fill colors.

5.04 Easy Customization

In an application whose tools have exclusive use of a region of screen space, the potential for user customization is limited. Even if the user can create new buttons, sliders, and other interactors, there is little space in which to put them. However, the overlay provides an essentially unlimited space; not only can tools take up the entire work area, but they can be placed off-screen to be scrolled on-screen when needed. In addition, because overlay tools and visual filters can be composed by overlapping, they provide an easy way for users to construct personalized macros.

5.05 Reduced Learning Time

Because overlay tools can combine several task steps into one, users need no longer learn these steps individually. For instance, instead of learning to select an object and apply a color to it, the user learns to use a color click-through button. Likewise, novices become experts in a natural way. An expert user knows where various tools are located, knows how to compose tools effectively, and has learned to move the tools into place quickly. A novice becomes an expert by learning the spatial layout of tools, learning to compose tools, and repeating commonly used motions until they become part of the user's motor memory. These tasks require little conscious effort.

5.06 Application-Independent Tools

Some user commands are common to enough applications that they are built into keyboards, such as the common Cut and Paste keys. When the user presses such a key, the window manager routes the keystroke to the user's current application. The overlay represents a new substrate on which such application-independent commands can be placed. In particular, if an overlay sheet can slide from application to application, its tools can be applied to whatever application is behind them whenever that makes sense, without any need for a distinguished current application. For example, the color-changing click-through buttons can change the colors of objects in different editors.

5.07 Usable with One or Two Hands

Many graphical user interfaces require the user to coordinate the use of two hands. For instance, the user may need to hold down the Control or Shift key while simultaneously using the mouse. While the overlay can be used more rapidly with two hands, it can also be used with a single hand that positions the overlay and then positions the cursor sequentially. It can be operated by users with a disabled hand or by able-bodied users who are using one hand for another task such as holding a telephone or a cup of coffee.

5.08 Different Display Sizes

Modern computers come with displays of many different sizes from pocket-sized to wall-sized. The overlay interfaces can span this range of sizes. Because overlay tools scroll and zoom, they can be used on tiny displays that have little or no room for fixed-position tool palettes. In addition, on very large displays, the user can move tools to any part of the screen, making it unnecessary to reach across the display to access a fixed menu region.

6.0 Conclusion

In conclusion it can be seen that the present invention provides a new style of user interface, the see-through interface, based on a visual depiction of a transparent overlay with active tool-defining regions. The see-through interface offers a new design space for user interfaces based on spatial rather than temporal modes and provides a natural medium for two-handed interaction. Because the interface is movable and overlies the application area, it takes no permanent screen space and can be conveniently adapted to a wide range of display sizes. Because the overlay tools are selected and brought to the work area simply by moving the overlay, the user's attention can remain focused on the work area. Because the operations and views are spatially defined, the user can work without changing the global context.

Further, the overlay of the present invention, when used with visual filters, allows operations on an application's hidden state, such as the equations in a spreadsheet, the grouping of objects in a graphical editor, or the position of water pipes in an architectural model. The user is able to view and edit this hidden state in a way that takes up no permanent screen space and requires no memorization of commands.

Additionally, the see-through interface provides a new paradigm to support open software architecture. Because the overlay tools can be moved from one application to another, rather than being tied to a single application window, they provide an interface to the common functionality of several applications and may encourage more applications to provide common functionality.

Moreover, because overlay sheets can contain an unlimited number of tools, they provide a valuable new substrate on which users can create their own customized tools and tool sets. In effect, the sheets can provide a user interface editor, allowing users to move and copy existing tools, compose macros by overlapping tools, and snap tools together in new configurations. Indeed, one overlay sheet can even be used to edit another.

While the above is a complete description of specific embodiments of the invention, various modifications, alternative constructions, and equivalents may be used. For example, while the above description of overlay tools stresses applications in graphical editing, many of the described tools can potentially be used in any screen-based application, including spreadsheets, text editors, multi-media editors, paint programs, solid modelers, circuit editors, scientific visualizers, or meeting support tools. The overlays can be used over animated media, including video and computer graphics. This is a particularly compelling application area because people viewing moving media are particularly reluctant to glance about from the workpiece to menus off on the side because they might miss an important event. In the context of animated media, the media itself may provide the event that triggers a button. For example, to make an object orange in a succession of frames of an animation, the user might just hold down a button in the place where that object appears. As each new frame is drawn, the button would be applied to the object at that position in that frame, automatically. In addition, while the emphasis above has been in the use of the overlay tools in connection with application programs, the overlays can be used in window systems to position windows and set parameters of the window system, such as window border colors, keyboard macros, and the like.

Therefore, the above description should not be taken as limiting the scope of the invention as defined by the claims.

7.0 References

[Bier86] Eric A. Bier and Maureen C. Stone. Snap-dragging. In Proceedings of Siggraph '86 (Dallas, August), Computer Graphics, Vol. 20, No. 4, ACM, 1986, pages 233–240.

[Bier88] Eric A. Bier. Snap-Dragging: Interactive Geometric Design in Two and Three Dimensions. Report No. UCB/CSD 88/416, Apr. 28, 1988, Computer Science Division, Department of Electrical Engineering and Computer Science, University of California, Berkeley, Calif. 94720. Also available as Xerox PARC technical report EDL-89-2.

[Bier90] Eric A. Bier and Aaron Goodisman. Documents as user interfaces. In R. Furuta (ed). EP90, Proceedings of the International Conference on Electronic Publishing, Document Manipulation and Typography, Cambridge University Press, 1990, pages 249–262. (The earliest paper on EmbeddedButtons)

[Bier91a] Eric A. Bier. EmbeddedButtons: documents as user interfaces. In Proceedings of the ACM SIGGRAPH Symposium on User Interface Software and Technology (South Carolina, November), ACM, 1991, pages 45–53.

[Bier91b] Eric A. Bier and Steve Freeman. MMM: a user interface architecture for shared editors on a single screen. In Proceedings of the ACM SIGGRAPH Symposium on User Interface Software and Technology (Hilton Head, S.C., November 11–13), ACM, 1991, pages 79–86.

[Bier92] Eric A. Bier. EmbeddedButtons: Supporting Buttons in Documents. ACM Transactions on Information Systems, Vol. 10, No. 4, October 1992, pages 381–407.

[English90] Paul M. English, Ethan S. Jacobson, Robert A. Morris, Kimbo B. Mundy, Stephen D. Pelletier, Thomas A. Polucci, and H. David Scarbro. An extensible, object-oriented system for active documents. In R. Furuta (ed). EP90, Proceedings of the International Conference on Electronic Publishing, Document Manipulation and Typography, Cambridge University Press, 1990, pages 263–276.

[Goldberg91] David Goldberg and Aaron Goodisman. Stylus user interfaces for manipulating text. In Proceedings of the ACM Symposium on User Interface Software and Technology (UIST '91, Hilton Head, S.C., November), 1991, pages 127–135.

[Hopkins91] Don Hopkins. The design and implementation of pie menus. Dr. Dobb's Journal. Vol. 16, No. 12, December 1991, pages 16–26.

[Kurlander92] David Kurlander and Steven Feiner. Interactive constraint-based search and replace. In Proceedings of CHI '92 (Monterey, Calif., May), Human Factors in Computing Systems, ACM, New York, 1992, pages 609–618.

[Kurtenbach91] Gordon Kurtenbach and William Buxton. Issues in combining marking and direct manipulation techniques. In Proceedings of the ACM Symposium on User Interface Software and Technology (UIST '91, South Carolina, November), ACM, 1991, pages 137–144.

[Ousterhout90] J. K. Ousterhout. Tcl: An embeddable command language. In winter USENIX Conference Proceedings, 1990.

[Pier88] Ken Pier, Eric A. Bier, and Maureen C. Stone. An Introduction to Gargoyle: An Interactive Illustration Tool. Proceedings of the Intl. Conf. on Electronic Publishing, Document Manipulation and Typography (Nice, France, April). Cambridge Univ. Press, (1988), pages 223–238.

[Rubine91] Dean Rubine. Specifying gestures by example. In Proceedings of ACM SIGGRAPH '91, Computer Graphics, Vol. 25, No. 4, July 1991, pages 329–337.

[Swinehart86] Daniel C. Swinehart, Polle T. Zellweger, Richard J. Beach, Robert B. Hagmann. A Structural View of the Cedar Programming Environment. ACM Transactions on Programming Languages and Systems, Vol. 8, No. 4, 1986, pages 419–490. Also available as Xerox PARC Technical Report CSL-86-1.

What is claimed is:

1. A method of operating a computer system where a program displays a representation of data and a user interacts with the data through the use of displayed tools and a displayed cursor, the user activating a particular tool by positioning the cursor within a tool-defining region associated with the particular tool and generating an event with the cursor so positioned, the method comprising the steps of:

displaying first and second click-through tools, each click-through tool having the property that when the event occurs within the click-through tool at a given location relative to the click-through tool, the result of an operation on the data depends on the location of the event relative to the displayed representation of the data; and positioning the second click-through tool so as to at least partially overlap the first click-through tool; and generating a particular event within a region of overlap of the first and second click-through tools; and in response to the particular event, performing a composite operation that is specified at least in part by the first and second click-through tools.

2. The method of claim 1 wherein at least one of the tool-defining regions is displayed as a transparent region.

3. A method of operating a processor-based machine, the machine including a user input facility, a display device, a processor coupled to the user input facility and the display device, a storage system for storing information including instructions defining at least one program to be executed by the processor and a set of associated data, the method comprising operating the processor-based machine to perform the steps of:

executing the program to operate on the data and display a visible representation thereof on the display device;

displaying on the display device a visual depiction of first and second tool-defining regions, each tool-defining region specifying at least in part a respective operation that is performed in response to an event within the tool-defining region, each tool-defining region and its respective specified operation being referred to as a tool;

each respective one of the first and second tools having the further property that when the event occurs within the respective tool-defining region at a given location relative to the respective tool-defining region, the result of the respective tool's specified operation depends on the location of the event relative to the visible representation, each of the respective tools being referred to as a click-through tool due to its having such further property;

positioning at least one of the first and second tool-defining regions so that there is a region of overlap between the first and second tool-defining regions;

generating a particular event within the region of overlap in response to a set of signals from the user input facility; and in response to the particular event within the region of overlap, performing an operation, referred to as a composite operation, that is specified at least in part by the first and second tool-defining regions.

4. The method of claim 3 wherein:

at least one of the first and second tool-defining regions includes at least a portion that is transparent.

5. The method of claim 3 wherein:

the first tool specifies an object property;

the second tool specifies the creation of a particular type of object; and said step of performing a composite operation includes creating an object of the type specified by the second tool with the object having the property specified by the first tool.

6. The method of claim 3 wherein:

the first tool specifies a first object property;

the second tool specifies a second object property;

the particular event in the region of overlap is characterized by position information that specifies a particular existing object; and said step of performing a composite operation includes applying to the particular existing object the first property specified by the first tool and the second property specified by the second tool.

7. The method of claim 3 wherein the user input facility includes an indirect pointing device, and further comprising the step of displaying a cursor on the display device so as to provide the user with a visual indication of positions specified by the pointing device.

8. The method of claim 3 wherein:

the operation of each of the first and second tools is characterized by the issuance of a command list having at least one command, the command list specifying the tool's respective operation; and said step of performing a composite operation includes issuing a command list that includes a concatenation of the command lists issued by the first and second tools.

9. The method of claim 3 wherein:

the operation of one of the first and second tools is characterized by the issuance of a command list having at least one command, the command list specifying the tool's respective operation;

the other tool specifies the modification of an incoming command list;

said step of performing a composite operation includes issuing a command list that includes the command list of the one tool, as modified by the other tool.

10. A method of operating a processor-based machine, the machine including a user input facility, a display device, a processor coupled to the user input facility and the display device, a storage system for storing information including instructions defining at least one program to be executed by the processor and a set of associated data, the method comprising operating the processor-based machine to perform the steps of:

executing the program to operate on the data and display a visible representation thereof on the display device;

displaying on the display device a visual depiction of first and second tool-defining regions, each tool-defining region specifying at least in part a respective operation that is performed in response to an event within the tool-defining region, each tool-defining region and its respective specified operation being referred to as a tool;

wherein the first tool is a modal tool whose specified operation is initiating a mode wherein a subsequent event at a location outside the first tool results in the creation of a particular type of object;

wherein the second tool is a click-through tool whose specified operation is applying a particular object property to a particular object when the second tool is superimposed on the particular object and an event is generated at a location within the second tool, which location further specifies selection of the particular object;

positioning the second tool so as to at least partially overlap the first tool;

generating a particular event within a region of overlap of the first and second tools in response to a set of signals from the user input facility; and in response to the particular event within the region of overlap, performing a composite operation that includes initiating a mode wherein the subsequent event results in the creation of an object of the type specified by the first tool with the object having the property specified by the second tool.

11. In an interactive computing environment including a processor coupled to a display screen and to an input facility suitable for positioning an object with respect to the display screen and further suitable for generating a signal specifying an event at a given position, and user interface software that the processor executes, that controls at least a portion of the display screen, and that is responsive to the input device, a method of operating the processor to execute the user interface software comprising the steps of:

displaying a window whose contents include a workpiece;

displaying a first transparent object that represents a first tool having a first object-altering property and a second transparent object that represents a second tool having a second object-altering property, the second tool at least partially overlapping the first tool;

positioning a region of overlap of the tools over the workpiece; and altering of the workpiece in response to a signal from the input facility specifying an event at a position on the workpiece and within the region of overlap, the nature of the alteration being determined at least in part by the first and second object-altering properties of the overlapping tools.

12. A method of operating a processor-based machine, the machine including a user input facility including a device having a button that is subject to being clicked by the user, a display device, a processor coupled to the user input facility and the display device, a storage system for storing information including instructions defining at least one program to be executed by the processor and a set of associated data, the method comprising operating the processor-based machine to perform the steps of:

operating on the data and displaying a visible representation thereof on the display device;

in response to signals from the user input facility, positioning a cursor relative to the visible representation;

displaying on the display device a visual depiction of a first tool-defining region, the first tool-defining region specifying at least in part a respective operation that is performed in response to the button being clicked while the cursor is positioned within the first tool-defining region, the first tool-defining region and its respective specified operation being referred to as the first tool;

displaying on the display device a visual depiction of a transparent second tool-defining region, the second tool-defining region specifying at least in part a respective operation that is performed in response to the button being clicked while the cursor is positioned within the second tool-defining region, the second tool-defining region and its respective specified operation being referred to as the second tool;

each respective one of the first and second tools having the further property that when the cursor is within the respective tool-defining region at a given location relative to the respective tool-defining region, the result of the respective tool's specified operation in response to the button being clicked depends on the location of the cursor relative to the visible representation when the button is clicked, each of the respective tools being further referred to as a click-through tool due to its having such further property;

positioning at least one of the first and second tool-defining regions so that there is a region of overlap between the first and second tool-defining regions; and performing an operation, referred to as a composite operation, that is specified at least in part by the first and second tool-defining regions in response to the button being clicked when the cursor is positioned within the region of overlap.

13. The method of claim 12 wherein:

the first tool specifies an object property;

the second tool specifies the creation of a particular type of object; and said step of performing a composite operation includes creating an object of the type specified by the second tool with the object having the property specified by the first tool.

14. The method of claim 12 wherein:

the first tool specifies a first object property;

the second tool specifies a second object property;

the cursor location in the region of overlap when the button is clicked specifies a particular existing object; and said step of performing a composite operation includes applying to the existing object the first property specified by the first tool and the second property specified by the second tool.

15. The method of claim 12 wherein:

the operation of each of the first and second tools is characterized by the issuance of a command list having at least one command, the command list specifying the tool's respective operation; and said step of performing a composite operation includes issuing a command list that includes a concatenation of the command lists issued by the first and second tools.

16. The method of claim 12 wherein:

the operation of one of the first and second tools is characterized by the issuance of a command list having at least one command, the command list specifying the tool's respective operation;

the other tool specifies the modification of an incoming command list;

said step of performing a composite operation includes issuing a command list that includes the command list of the one tool, as modified by the other tool.

17. A method of operating a processor-based machine, the machine including a user input facility including a device having a button that is subject to being clicked by the user, a display device, a processor coupled to the user input facility and the display device, a storage system for storing information including instructions defining at least one program to be executed by the processor and a set of associated data, the method comprising operating the processor-based machine to perform the steps of:

operating on the data and displaying a visible representation thereof on the display device;

in response to signals from the user input facility, positioning a cursor relative to the visible representation;

displaying on the display device a visual depiction of a first tool-defining region, the first tool-defining region specifying at least in part a respective operation that is performed in response to the button being clicked while the cursor is positioned within the first tool-defining region, the first tool-defining region and its respective specified operation being referred to as the first tool;

displaying on the display device a visual depiction of a transparent second tool-defining region, the second tool-defining region specifying at least in part a respective operation that is performed in response to the button being clicked while the cursor is positioned within the second tool-defining region, the second tool-defining region and its respective specified operation being referred to as the second tool;

wherein the first tool is a modal tool whose specified operation is initiating a mode wherein a subsequent event generated by positioning the cursor at a location outside the first tool and manipulating the button results in the creation of a particular type of object;

wherein the second tool is a click-through tool whose specified operation is applying a particular object property to a particular object when the second tool is superimposed on the particular object and the button is clicked while the cursor is at a location within the second tool, which location further specifies selection of the particular object;

positioning at least one of the first and second tools so that there is a region of overlap between the first and second tools; and in response to the button being clicked when the cursor is positioned within the region of overlap, performing a composite operation that includes placing the cursor in a mode wherein the subsequent event results in the creation of an object of the type specified by the first tool with the object having the property specified by the second tool.

18. A method of operating a processor-based machine, the machine including a user input facility including at least one device that generates signals specifying position, a display device, a processor coupled to the user input facility and the display device, a storage system for storing information including instructions defining at least one program to be executed by the processor and a set of associated data, the method comprising operating the processor-based machine to perform the steps of:

executing the program so as to operate on the data and to display a visible representation thereof on the display device, the visible representation including an object;

displaying on the display device a visual depiction of a first tool-defining region, the first tool-defining region specifying at least in part a first operation that is performed in response to an event within the first tool-defining region, the first tool-defining region and its specified operation being referred to as the first tool;

displaying on the display device a visual depiction of a second tool-defining region, the second tool-defining region specifying at least in part a second operation that is performed in response to an event within the second tool-defining region, the second tool-defining region and its specified operation being referred to as the second tool;

in response to a first set of signals from the user input facility, positioning at least one of the first and second tool-defining regions so that there is a region of overlap between the first and second tool-defining regions;

in response to a second set of signals from the user input facility, generating a particular event within the second tool-defining region at a position that specifies the object; and in response to the particular event,
(a) if and only if the particular event is within the region of overlap, performing an operation, referred to as the composite operation, on the object, the composite operation being specified at least in part by the first and second tools, add
(b) otherwise, performing the second operation on the object without performing the first operation.

19. The method of claim 18 wherein:

the first tool specifies a first object property;

the second tool specifies a second object property;

said conditional step of performing the composite operation includes applying the first and second properties to the object; and said conditional step (b) includes applying the second property but not the first property to the object.

20. The method of claim 18 wherein the user input facility includes an indirect pointing device, and further comprising the step of displaying a cursor on the display device so as to provide the user with a visual indication of positions specified by the pointing device.

21. The method of claim 18 wherein:

the operation of each of the first and second tools is characterized by the issuance of a command list having at least one command, the command list specifying the tool's respective operation; and said step of performing a composite operation includes issuing a command list that includes a concatenation of the command lists issued by the first and second tools.

22. The method of claim 18 wherein:

the operation of the second tool is characterized by the issuance of a command list having at least one command, the command list specifying the tool's respective operation;

the first tool specifies the modification of the second tool's command list;

said step of performing a composite operation includes issuing a command list that includes the command list of the second tool, as modified by the first tool.

23. A method of operating a processor-based machine, the machine including a user input facility, a display device, a processor coupled to the user input facility and the display device, a storage system for storing information including instructions defining at least one program to be executed by the processor and a set of associated data, the method comprising operating the processor-based machine to perform the steps of:

operating on the data and displaying a visible representation thereof on the display device;

displaying on the display device a visual depiction of a first tool-defining region, the first tool-defining region specifying, in response to an event within the first tool-defining region, the operation of initiating a mode wherein a subsequent event results in the creation of a particular type of object;

displaying on the display device a visual depiction of a transparent second tool-defining region, the second tool-defining region specifying a particular object property that is invoked in response to an event within the second tool-defining region;

in response to a first particular event within the first tool-defining region, initiating the mode; and in response to a subsequent second particular event within the second tool-defining region, creating the particular object specified by the first tool-defining region having the particular object property specified by the second tool-defining region.

24. A method of operating a computer system where a program displays data and a user interacts with the data by activating displayed tools, each tool having an associated tool-defining region and a specified operation, the user activating a particular tool by designating a position within the particular tool's tool-defining region and initiating an event at the designated position, the method comprising the steps of:

displaying first and second tools, referred to as click-through tools; and positioning the first and second click-through tools so that each overlaps a desired particular portion of the displayed data;

generating a particular event within a region of overlap of the first and second click-through tools and at a location relative to the displayed data, which location specifies the desired particular portion of the displayed data; and in response to the particular event, performing a composite operation that is specified at least in part by the first and second click-through tools on the desired particular portion of the displayed data.

25. The method of claim 24 wherein:

at least one of the first and second tool-defining regions includes at least a portion that is transparent.

26. The method of claim 24 wherein:

the first tool specifies a first object property;

the second tool specifies a second object property;

the location of the particular event specifies a particular existing object; and said step of performing a composite operation includes applying to the existing object the first property specified by the first tool and the second property specified by the second tool.

27. The method of claim 24 wherein:

the operation of each of the first and second tools is characterized by the issuance of a command list having at least one command, the command list specifying the tool's respective operation; and said step of performing a composite operation includes issuing a command list that includes a concatenation of the command lists issued by the first and second tools.

28. The method of claim 24 wherein:

the operation of one of the first and second tools is characterized by the issuance of a command list having at least one command, the command list specifying the tool's respective operation;

the other tool specifies the modification of an incoming command list;

said step of performing a composite operation includes issuing a command list that includes the command list of one tool, as modified by the other tool.

* * * * *